Aug. 19, 1958     D. S. ANGELL ET AL     2,848,124
ARTICLE HANDLING APPARATUS
Filed July 1, 1955     16 Sheets-Sheet 15

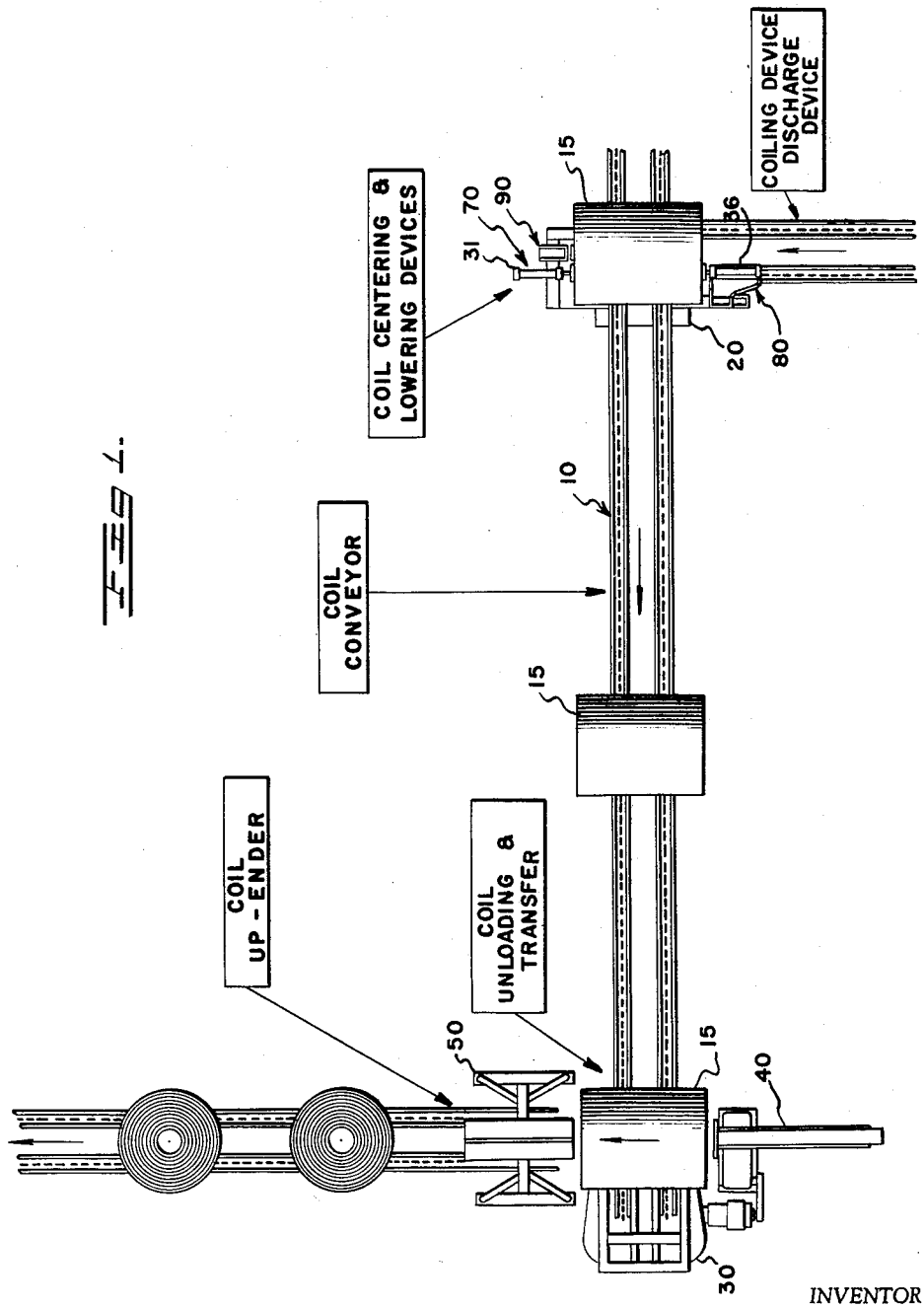

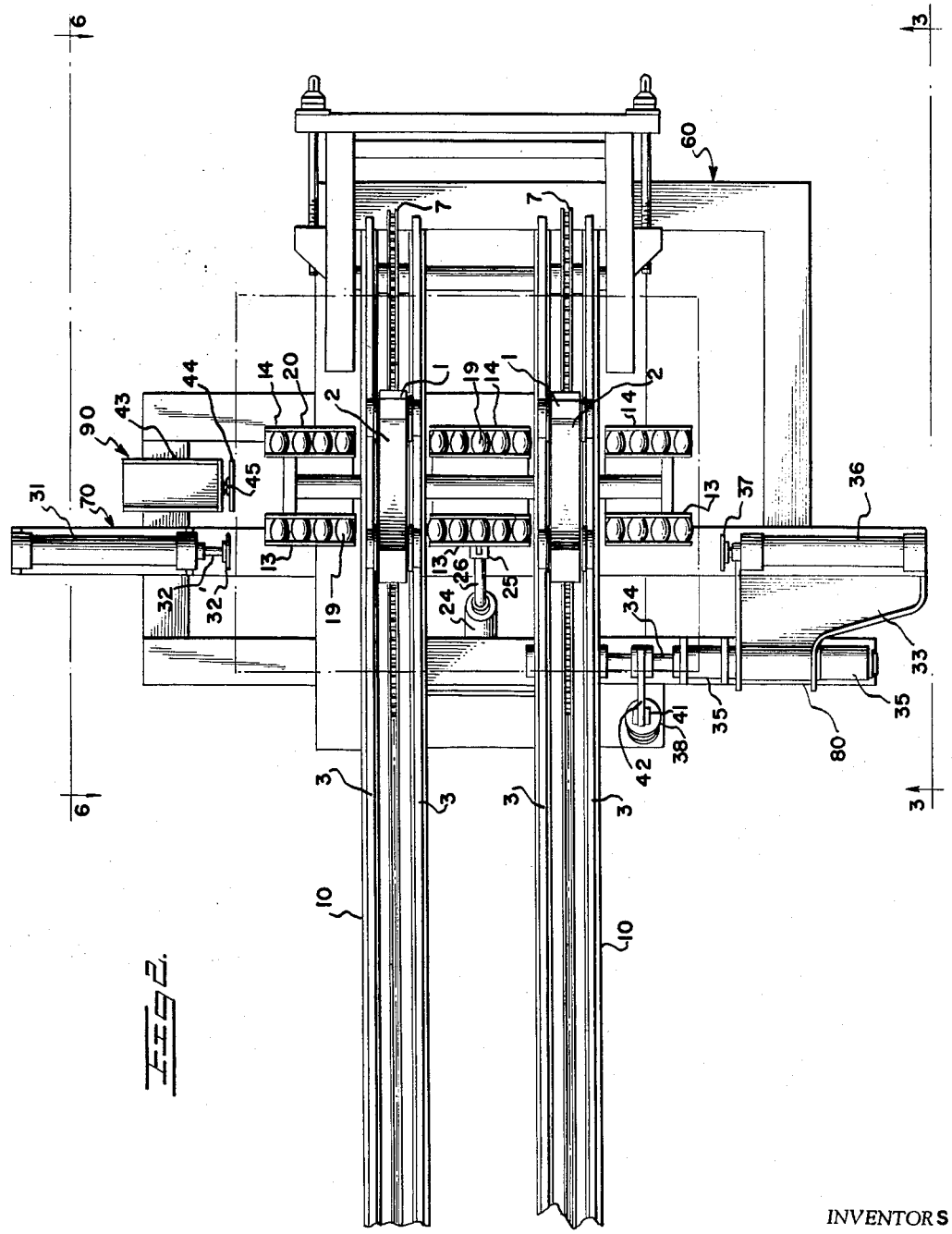

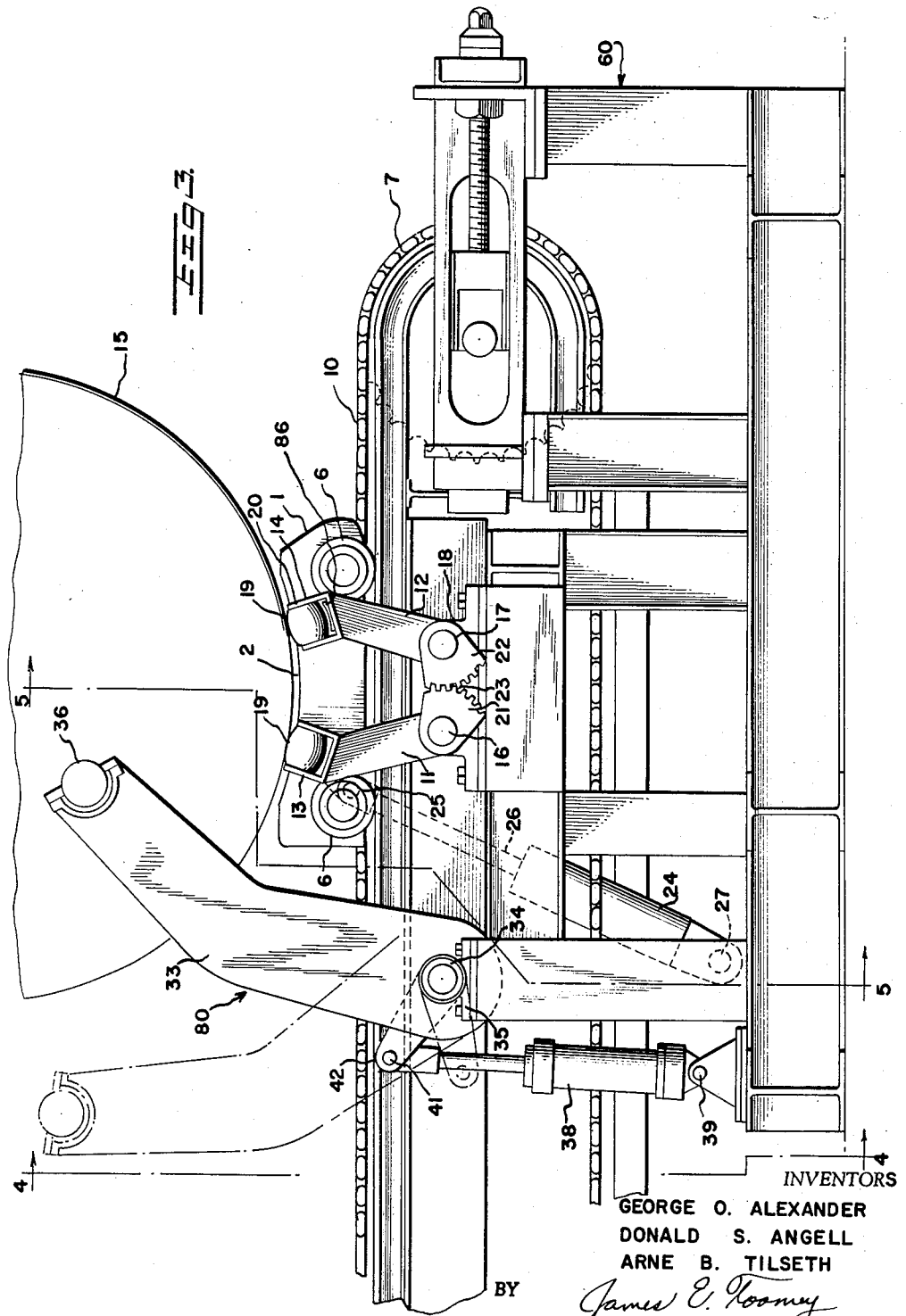

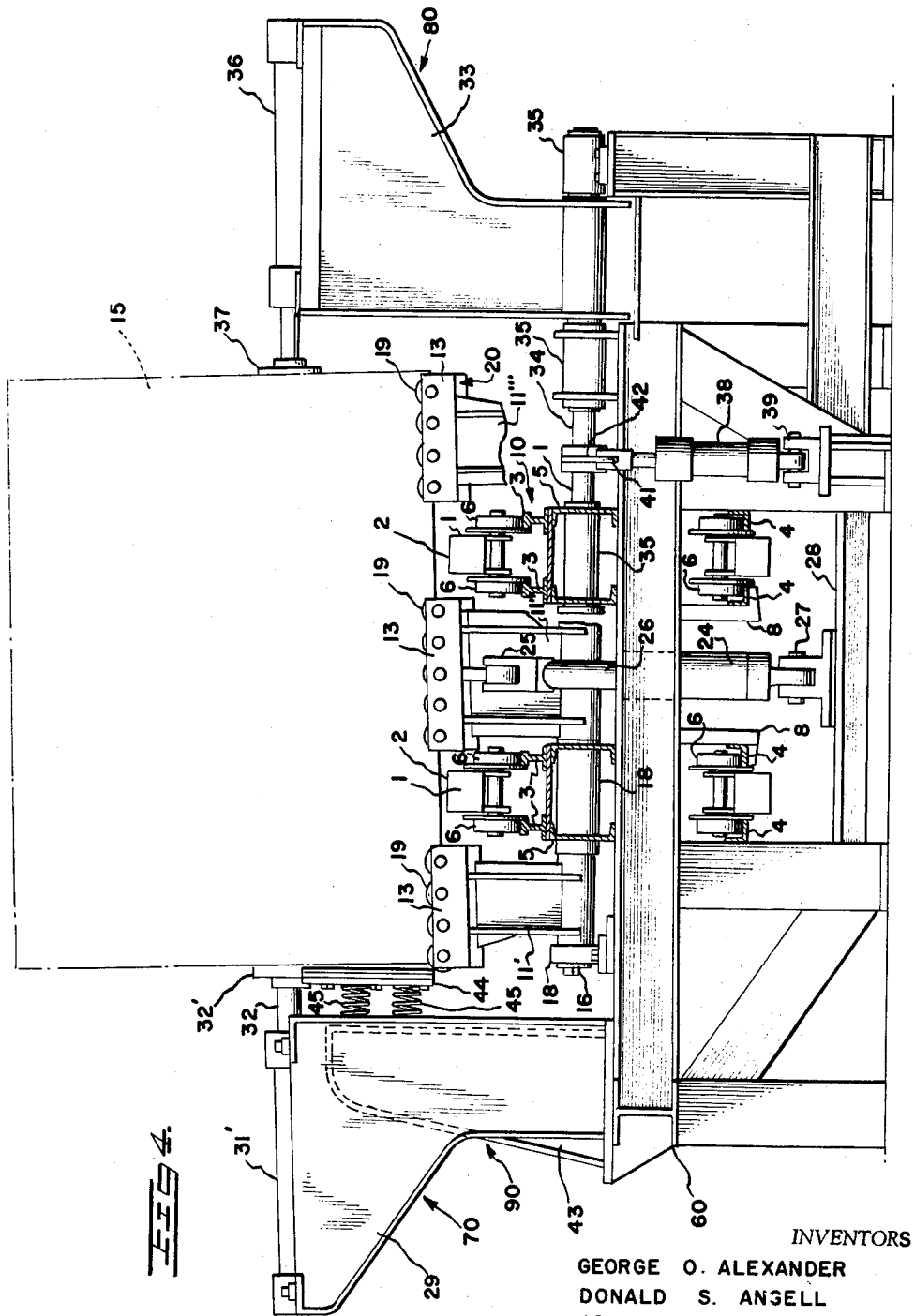

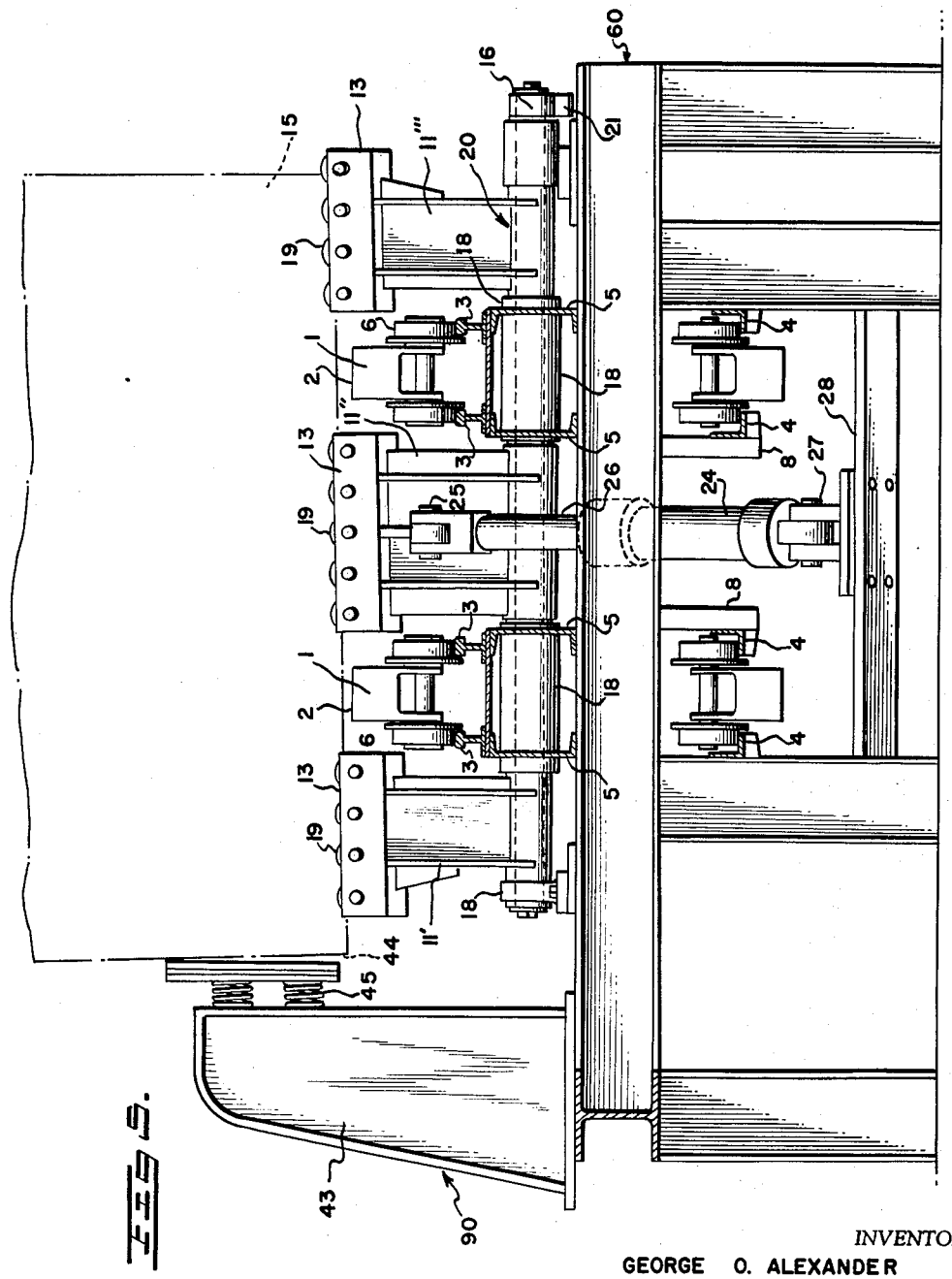

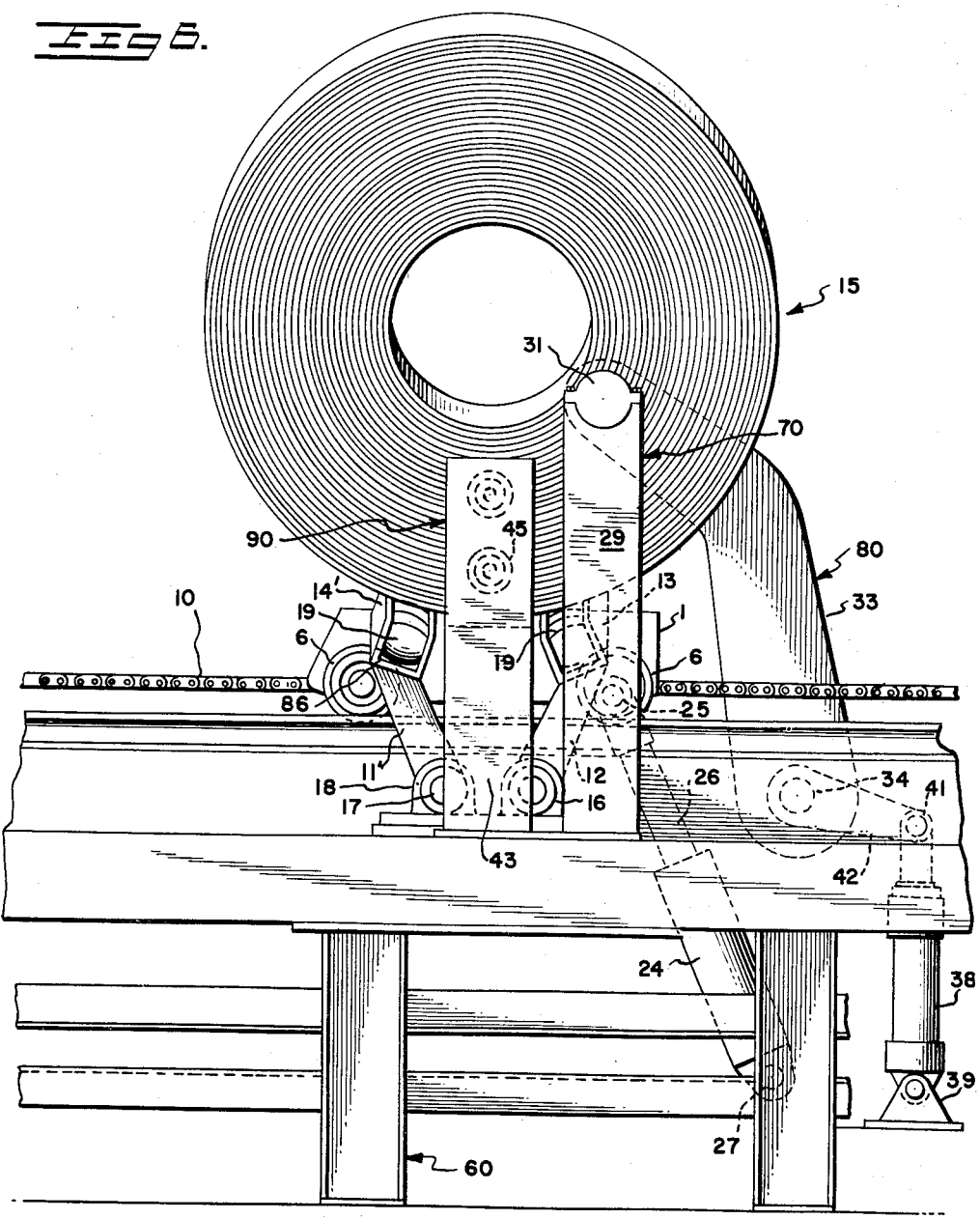

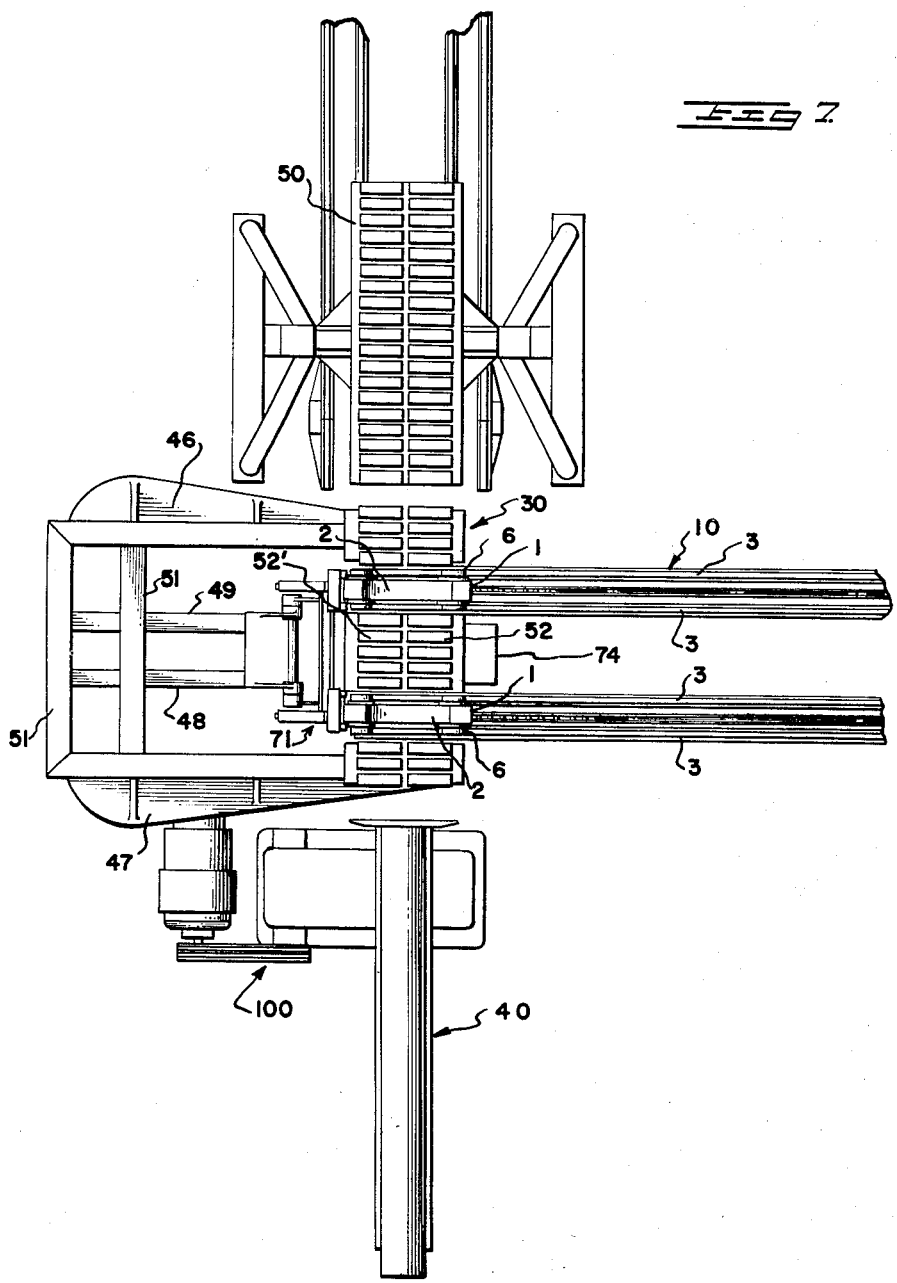

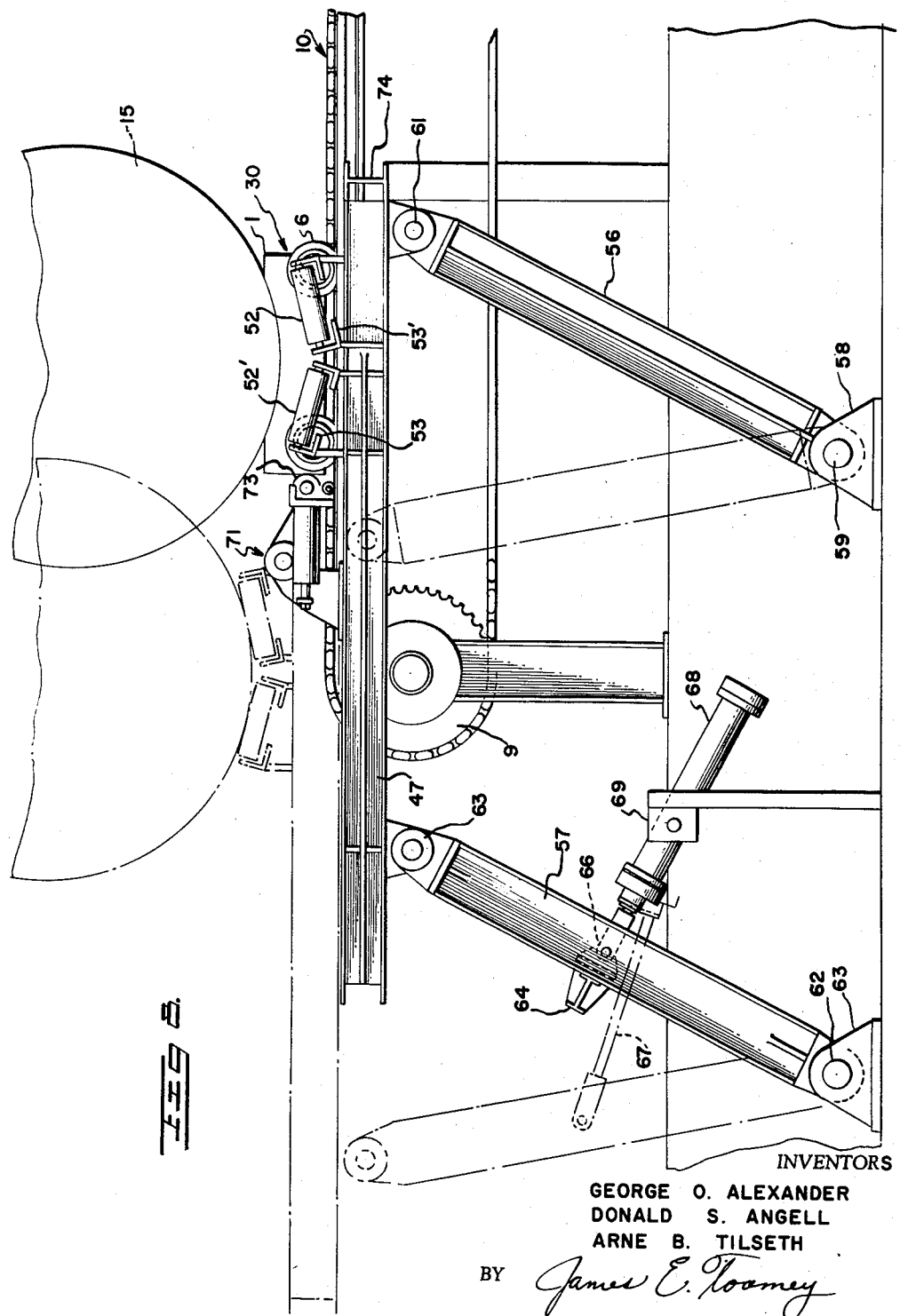

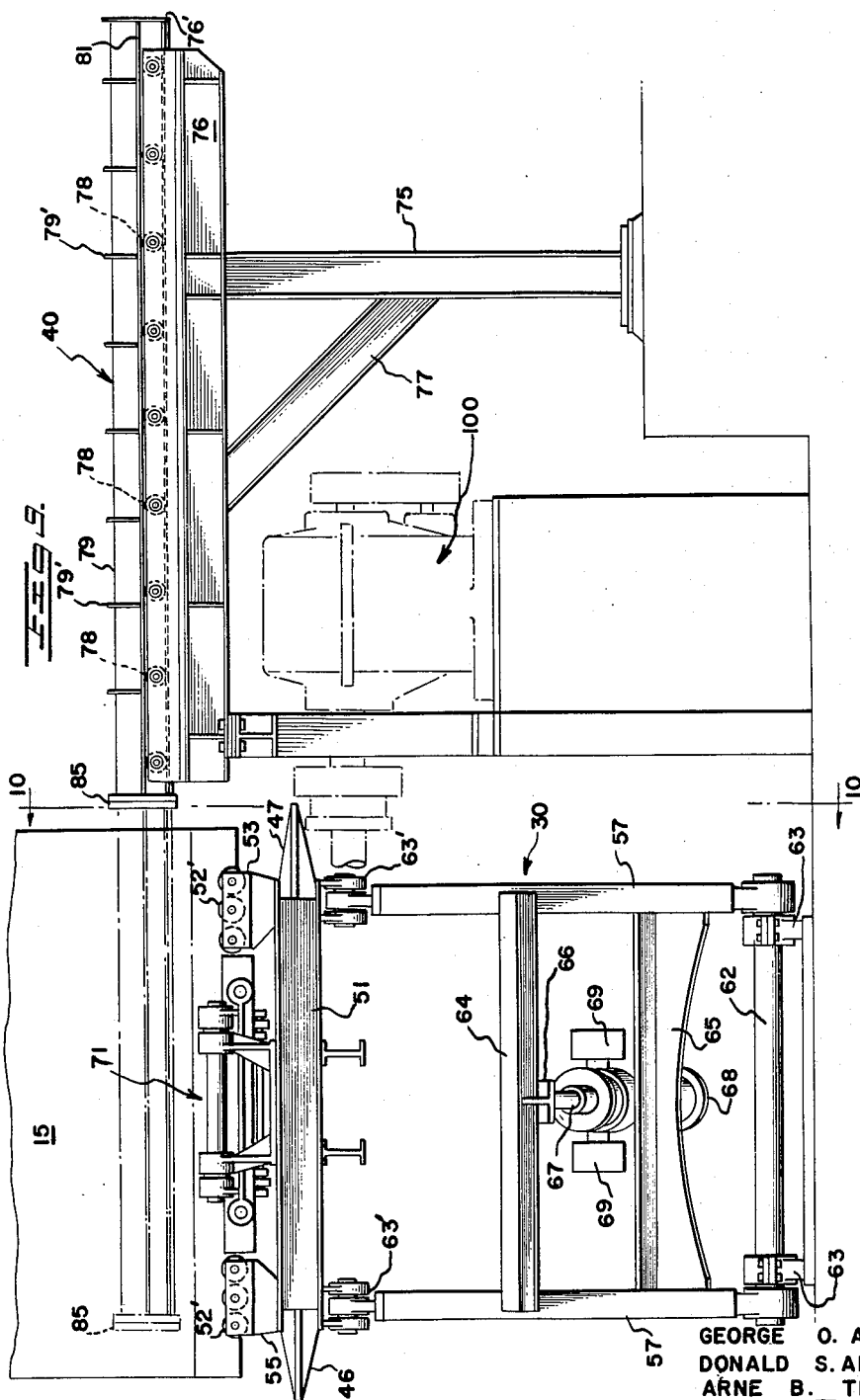

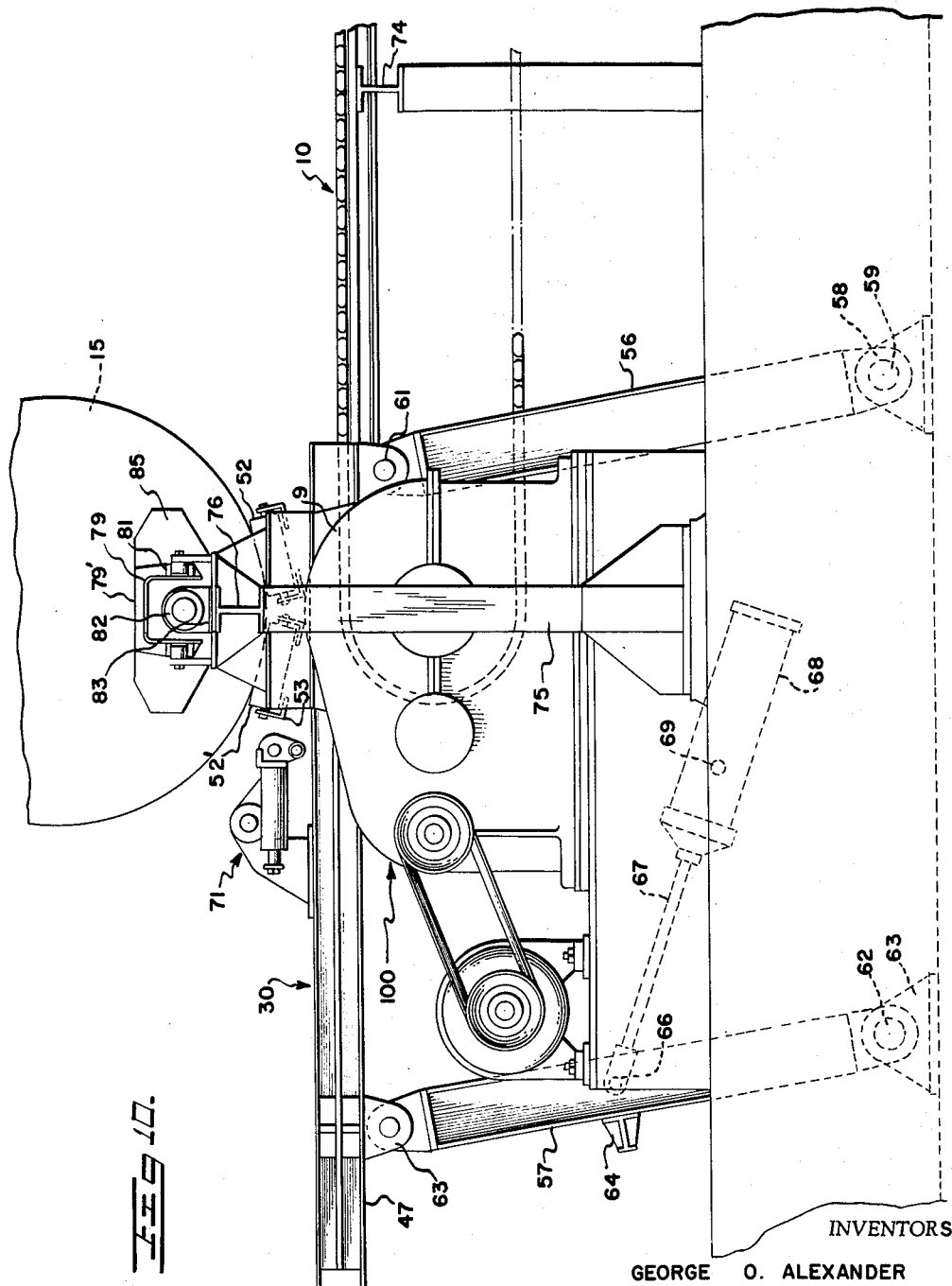

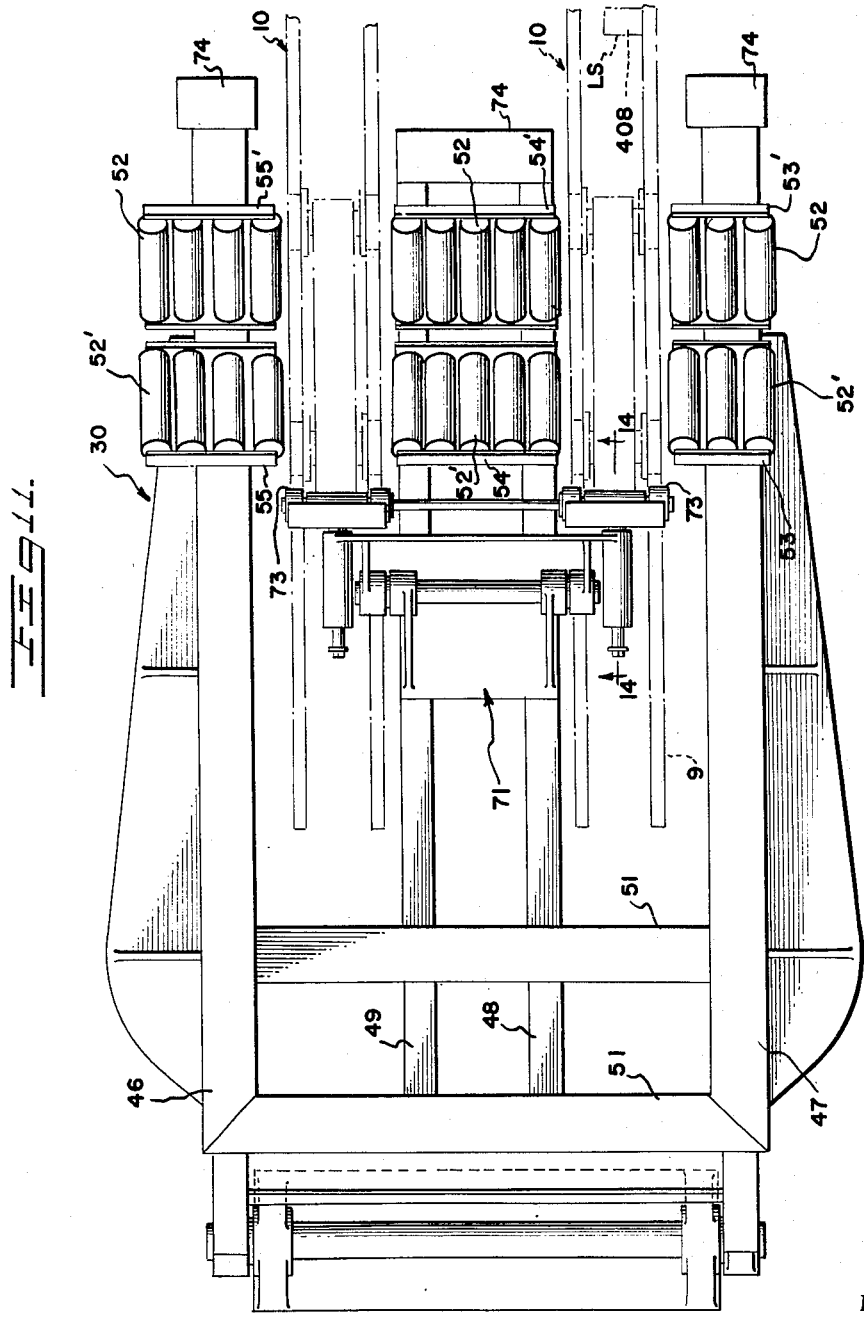

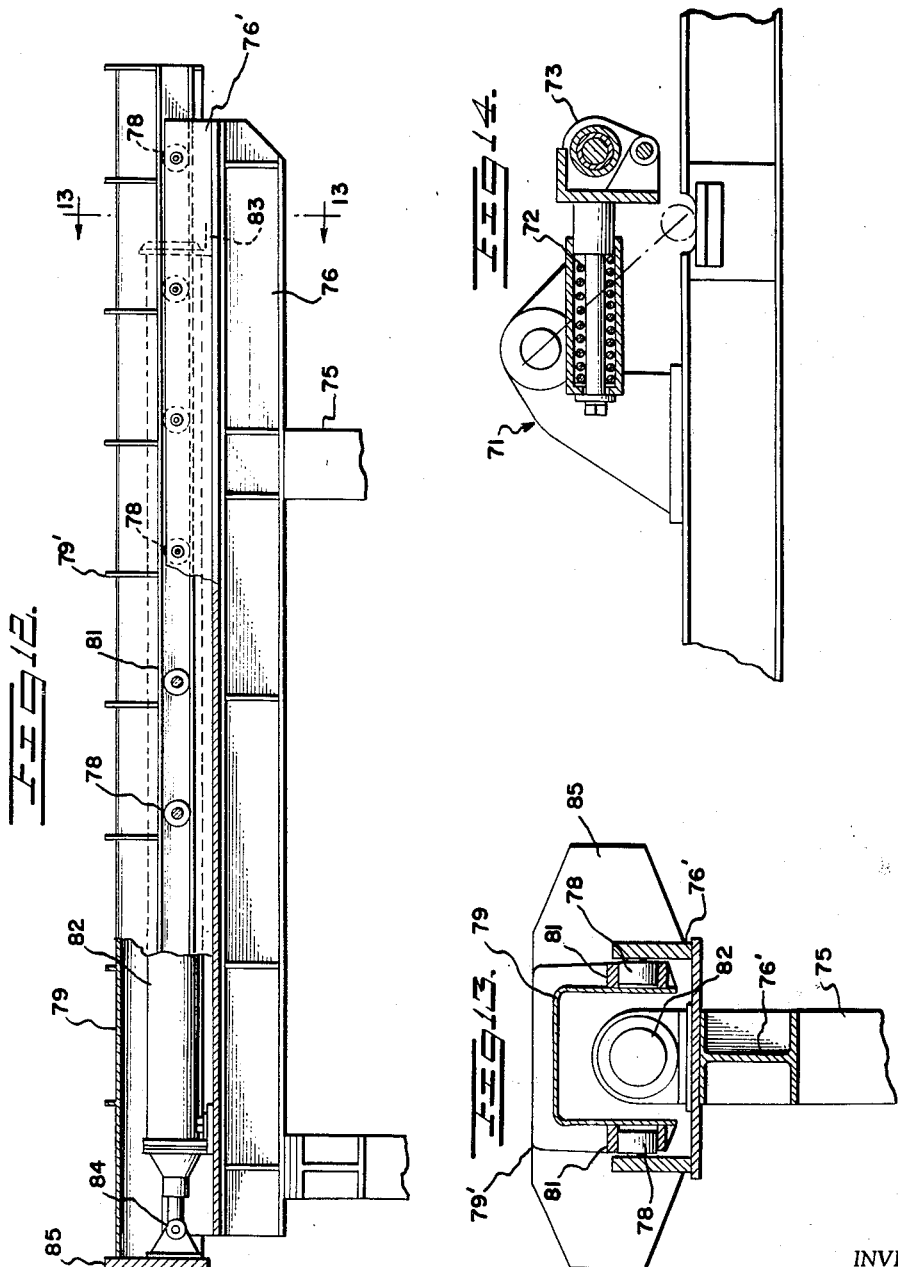

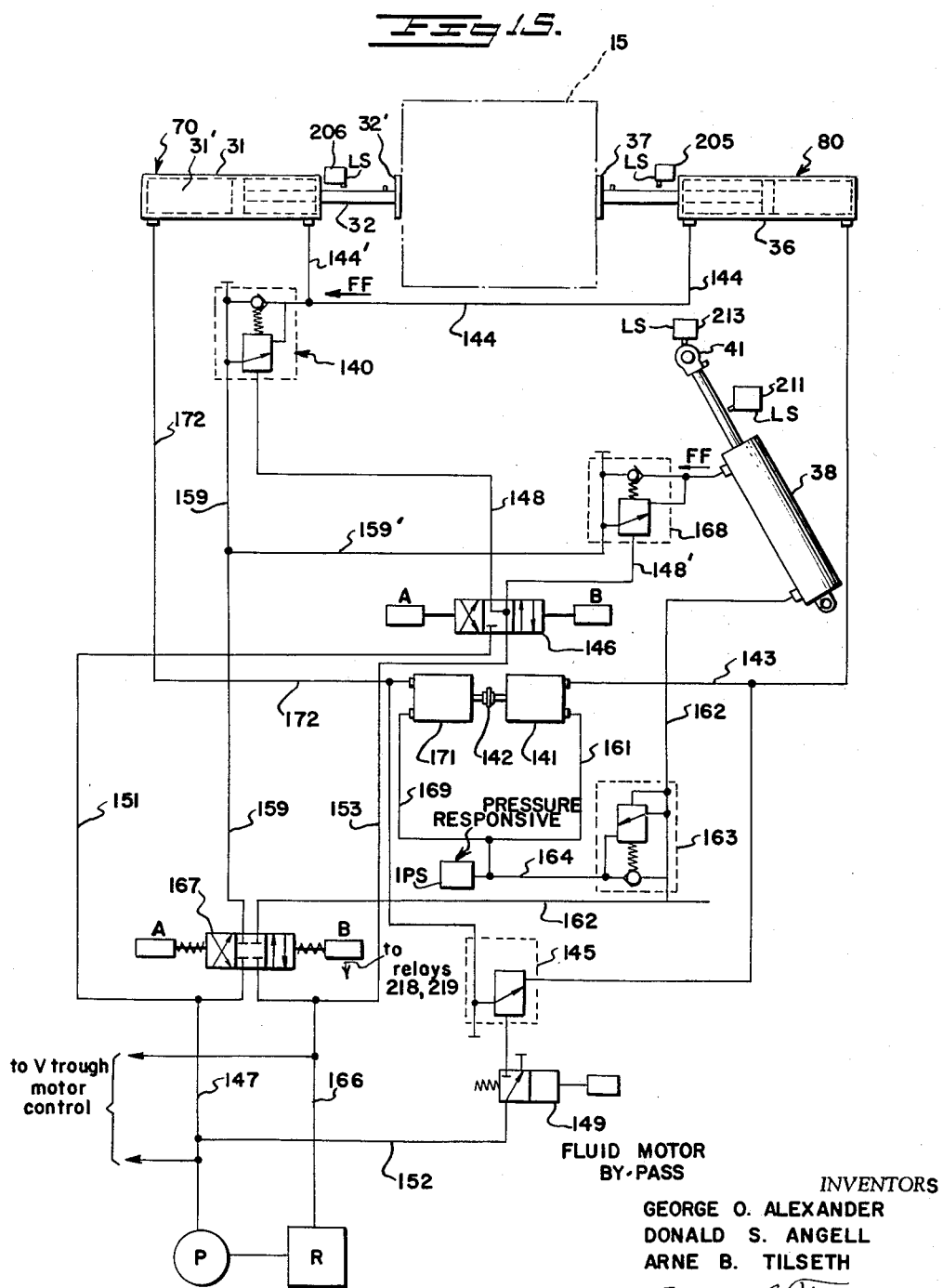

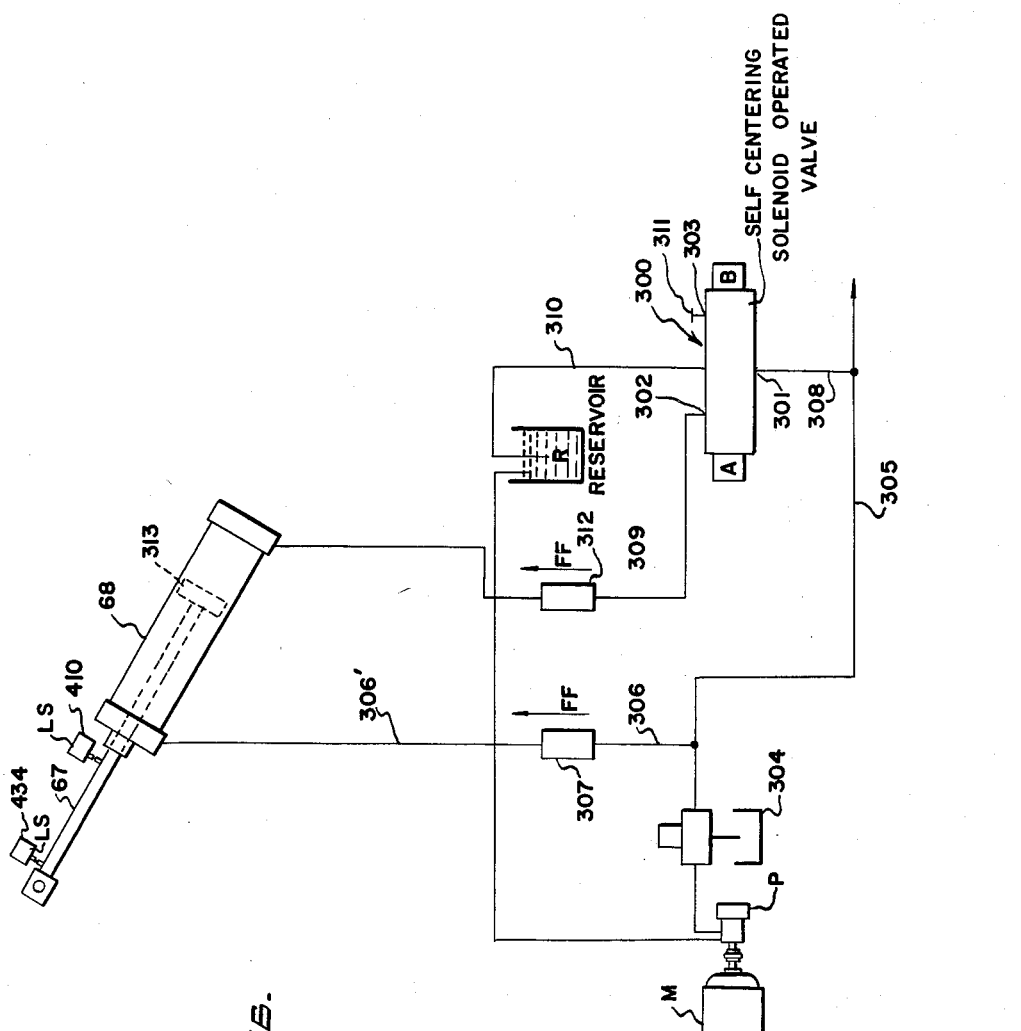

INVENTORS
GEORGE O. ALEXANDER
DONALD S. ANGELL
ARNE B. TILSETH
BY James E. Toomey
ATTORNEY

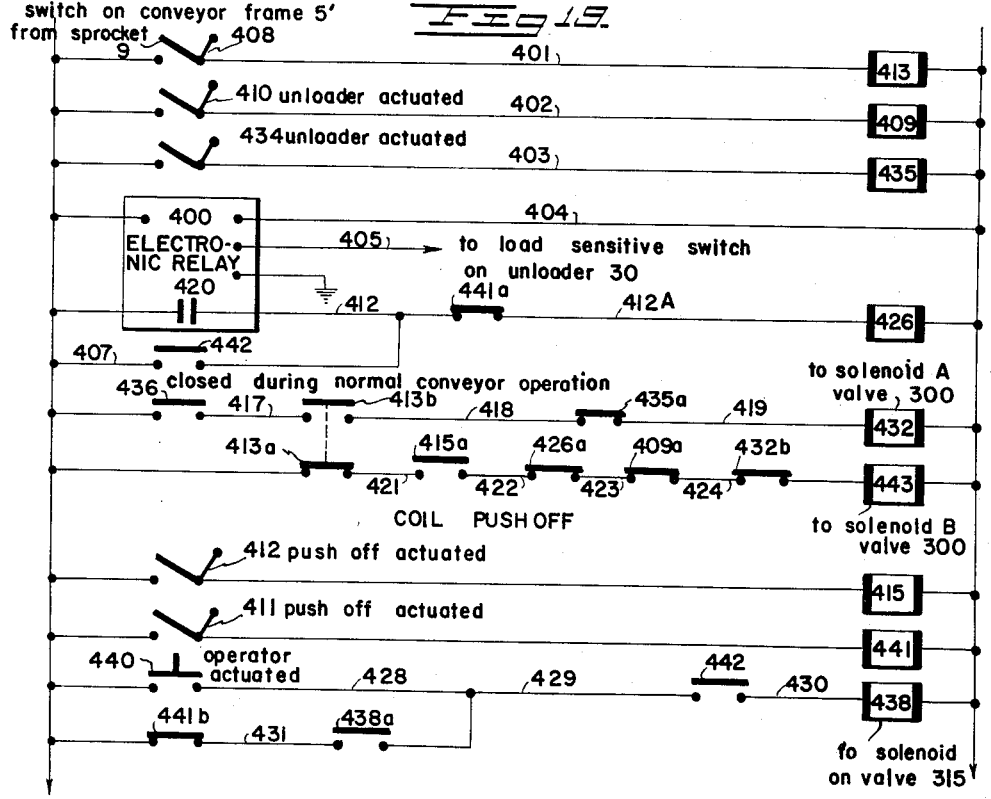
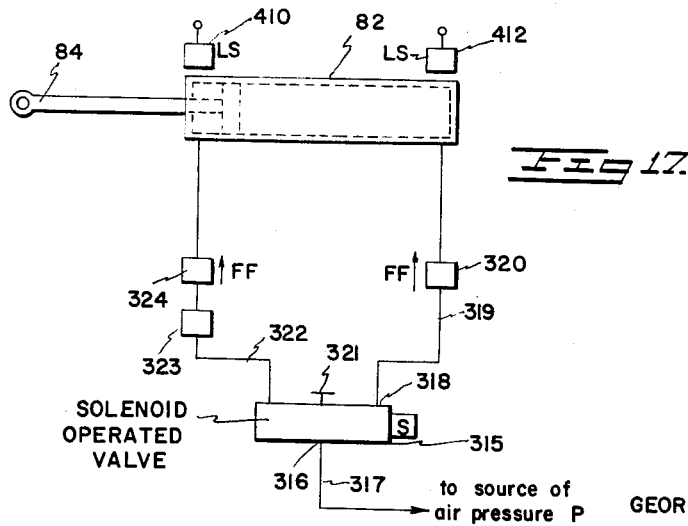

United States Patent Office 2,848,124
Patented Aug. 19, 1958

2,848,124

ARTICLE HANDLING APPARATUS

Donald S. Angell, Dishman, Wash., Arne B. Tilseth, Post Falls, Idaho, and George O. Alexander, Walnut Creek, Calif., assignors to Kaiser Aluminum & Chemical Corporation, Oakland, Calif., a corporation of Delaware Application July 1, 1955, Serial No. 519,312

23 Claims. (Cl. 214—91)

The instant invention is directed to an apparatus and system for transporting coiled material. More specifically, the instant device is directed to a system and apparatus for handling coiled sheet material such as aluminum or the like.

In particular, the invention is directed to a system and apparatus for handling coiled sheet metal material which has been coiled at a high rate of speed at the exit end of a rolling mill, the resultant coil being of considerable size and weight such as to require handling by heavy mechanical apparatus after the coiling operation has been completed.

Such a system as will be hereinafter disclosed is adapted for use with a variety of reeling or coiling machines but for purposes of illustration is shown as it would be applied as a subsequent operation to the coiling process as performed on the "Belt Wrapper" devices and allied apparatus described and claimed in Wood Patent 2,699,904.

Referring to the above-identified Wood patent, it may be seen that there is disclosed therein an apparatus for coiling a sheet as it emerges from a rolling mill, the coiling operation being carried on at a high speed and in such a manner as to greatly facilitate the rolling mill operation by enabling the rapid removal of finished material in coiled condition from close proximity to the mill. It is with the problem of removing the material from the environment of the coiling devices which are also in close proximity to the mill, that the instant disclosure relates.

In the use of the belt wrapper and apparatus disclosed in the prior identified application and patent it has been the customary practice to push the material from a collapsible block, about which it has been wound, laterally of the block and onto a suitable mechanism known in the art as a downender and thereby change the position of the axis of winding of the coiled material such that the original axis about which the material was coiled is rotated 90°. The coiled sheet is then deposited on a suitable conveying means with this original axis disposed in a vertical plane. It may be seen then that considerable difficulty is encountered by reason of the fact that the last wrap of the material has a tendency to unwind when the coiled sheet is placed in the position with the original axis of winding disposed in a vertical plane. This unwinding tendency has resulted in numerous disadvantages some of which will be pointed out hereinafter and has necessitated a complete re-evaluation of the prior art handling methods.

One of the principal difficulties resulting from the former method of handling the coiled material has been the fact that, in order to prevent the undesired unwinding of the last wrapping of tail of the sheet material, suitable strapping means must be applied to the coil in the interim period between the time that it has been coiled and the time it is transposed to a position with its axis of winding in a vertical plane. The necessity for such a strapping operation has required the presence of personnel in close proximity to the coiling apparatus and to the mill itself. As in all cases where manual operations must be conducted in close proximity to heavy machinery, considerable danger exists with respect to such personnel, both by reason of the operation of the machinery itself and further by reason of the considerable size and weight of the coiled material produced by the mill as well as the coiling operations themselves.

Additionally, the chance for human error in judgment as well as the chance for accident by reason of entanglement in the heavy equipment is ever present and in addition to producing unwarranted hazards to the persons involved in the operation, also is effective to reduce the efficiency of the operation of the mill, the coiling apparatus and the subsequent handling operations.

A further disadvantage in the formerly existing systems of handling the coiled material results in the actual wrapping operation performed by the sheet coiling machinery. It can be appreciated that by reason of the high velocity attained by the sheet as its exits from the mill, the wrapping operation performed by any cooperating coiling devices must be at a considerable speed. Accordingly, as the tail end or last portion of the sheet to be wrapped emerges from the mill and is coiled about the mandrel or block of the coiling device, this portion has a tendency to swing out and slap or flap by reason of the centrifugal force imposed during the reeling operation. This factor in and of itself poses a considerable condition of hazard to persons working in close proximity to the operation and coupled with the fact that the coiled sheet is heated and also is lubricated as is the customary practice in the rolling art, the slapping or flapping action produces a considerable spray and discharge of lubricant material which in and of itself may be heated and which upon contact with any persons in close proximity of the operation can produce serious consequences.

Coupling the above-mentioned safety hazards with the inefficiency that can be produced say, for example, by the accidental unwinding of a coil of sheet during the usual handling process as well as the attendant reduction in efficiency of the entire operation which may be caused by errors in human judgment, it is apparent that many attempts have been made to suitably arrange proper apparatus and combination of controls such that all manual operations in close proximity to a mill and sheet coiling operation will be eliminated. It is believed then that the crux of the above problem resides in the use of proper apparatus and systems for handling the coiled material upon completion of the wrapping operation.

Thus, it is primarily with the handling of the sheet material after it has been properly coiled on the belt wrapper and associated apparatus disclosed in Patent 2,699,904, referred to above and similar apparatus, to which the instant disclosure and claims are directed.

Having in mind the considerations outlined above, an object of the invention is to provide a conveying and handling system for coiled sheet material in which the operation is considerably safer than such operations as have heretofore been carried out.

Another obejct of the invention is to provide a coil handling system and apparatus which is highly efficient in removing the coiled material away from a rolling mill and subsequent coiling operation.

A further object of the invention is to produce a system and apparatus for handling coiled material wherein the entire operation is conducive to safety and whereby any such manual acts as are required may be carried out at a distance considerably removed from the mill and wrapping operation resulting in the formation of coiled sheet material.

Another object of the instant invention is to provide a conveying system and apparatus in which the coiled material is handled in a position wherein the axis about which it has been coiled is disposed horizontally of the floor or base structure and wherein at all times the tail of the coil or wrapped material is maintained under pressure to prevent unwanted unwrapping of the coiled sheet.

Still a further object of the invention is to provide a conveying system and apparatus wherein the coiled sheet material may be rapidly and efficiently removed from close proximity to the coiling operation and wherein the elements comprising the conveyor system can be arranged to occupy a minimum of floor space and at the same time efficiently and rapidly perform the operations for which intended.

Still another object of the invention is to provide a system and apparatus for handling coiled sheet material wherein upon discharge from the belt wrapping operation the coiled material is properly centered on a conveying apparatus such that all subsequent steps in the operation may be successfully and efficiently performed either automatically or under the control of an operator positioned in a remote control station.

Still another object of the invention is to provide a coil unloading device which is capable of acting in conjunction with an endless belt type of conveyor wherein the transfer from the conveyor to other apparatus is performed rapidly, efficiently and with a maximum of safety.

These and other objects and advantages arising from the instant apparatus and system will become apparent from the following detailed description and drawings, wherein:

Figure 1 is a schematic plan view of a system showing the manner in which a coiled article may be handled and transported, utilizing the features of the instant invention.

Figure 2 is a top plan view of the loading end of a conveyor system for handling coiled sheet material, showing an elevator mechanism which acts in conjunction with a centering device for locating the coiled material in proper centered relation with respect to the movable article carrying elements of the system.

Figure 3 is an elevational view taken along the line 3—3 of Figure 2 showing a collapsible roll trough, a centering device in article centering position, and elements of the movable article carrying conveyor used in the disclosed system.

Figure 4 is an end elevational view taken along the lines 4—4 of Figure 3 showing the article centering device collapsible trough device and further showing the coiled article as well as the condition of the system components after centering of the article and prior to collapse of the roll trough assembly.

Figure 5 is an enlarged elevational view showing details of the conveyor and the collapsible roll trough similar to Figure 4 and taken along the line 5—5 of Figure 3 and showing the position of the coiled article prior to centering.

Figure 6 is an elevational view of the coil centering apparatus shown in Figure 2 taken along the line 6—6 of Figure 2.

Figure 7 is a top plan view of the exit or discharge end of the same conveyor as disclosed in Figure 1 and showing an unloading mechanism as well as a suitable push-off mechanism.

Figure 8 is a side elevational view of the discharge end of the article conveying elements and showing the unloading mechanism positioned with respect to an article conveying element prior to the initiation of the unloading operation, with certain parts of the conveyor being shown in phantom.

Figure 9 is an end view of the unloading device shown in Figure 8 showing the coil push-off mechanism with certain parts of the conveyor mechanism being deleted.

Figure 10 is a side elevation of the conveyor mechanism and the coil unloading device, the unloading device having moved from the position shown in Figure 8 to its article discharge position with respect to a push-off device.

Figure 11 is a top plan view of the unloading mechanism shown in Figures 8, 9 and 10.

Figure 12 is an enlarged side elevational view of the push-off mechanism shown in Figure 9.

Figure 13 is a sectional view of the push-off mechanism shown in Figure 12 and taken along the lines 13—13 thereof.

Figure 14 is an elevational section through the unloader abutment device.

Figure 15 is a schematic diagram of the hydraulic mechanism and circuits used in the coil centering and loading apparatus as shown in Figures 1, 2, 3, 4, 5 and 6.

Figure 16 is a diagram of the hydraulic circuit used in conjunction with the coil unloading elevator mechanism.

Figure 17 is a diagram of pneumatic circuit used for the push-off mechanism as disclosed.

Figure 19 is an additional diagram of an electrical circuit which may be used in conjunction with the hydraulic circuit as well as the pneumatic systems shown in Figures 16 and 17.

Figure 18:
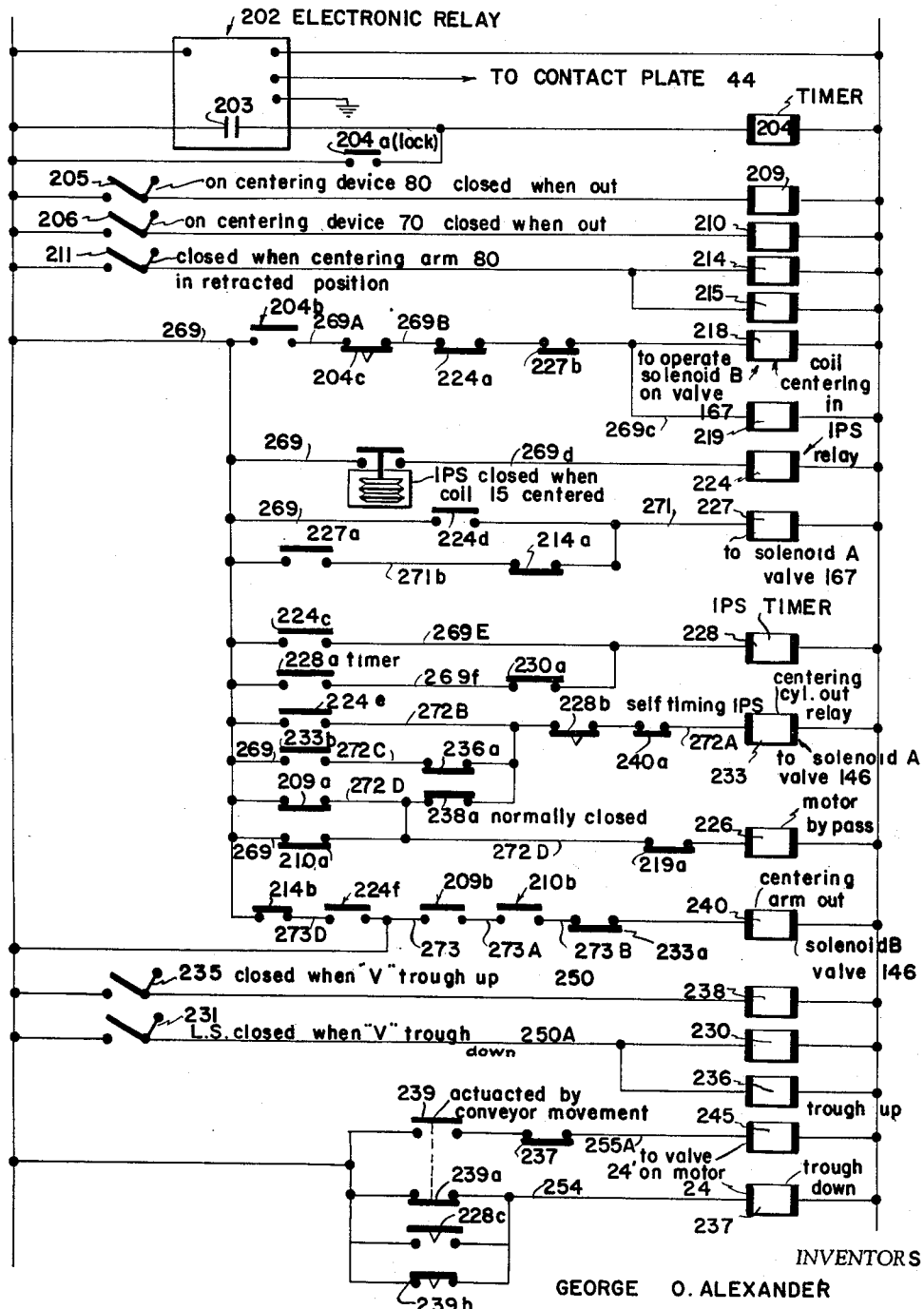
Figure 18 is a schematic diagram of electrical circuit which may be used with the hydraulic circuit shown in Figure 15 to provide for automatic operation of the coil centering and lowering operation.

Referring in particular to Figures 1, 2 and 7 of the drawings, a brief general description of the handling and conveying operation will be provided in order to aid in a better understanding of the operation of various components which make up the system. The specific construction employed in the various components will be more fully described in the specification to follow. The sheet material has been previously passed through a high speed rolling mill and coiled on a reel with the assistance of a belt wrapper device of the type disclosed in Wood Patent 2,699,904. A suitable elevator mechanism shown and described in copending application S. N. 519,373, filed July 1, 1955, is elevated beneath the coiled material and by means of a suitable push-off element and power driven rollers, the now coiled article is directed laterally off the belt wrapper block or mandrel to clear the same. The coiled material is now passed onto a collapsible roll trough assembly 20.

At this point the roll trough assembly 20 is in a position such that the bottom of the coiled material is spaced above one of a series of suitable carts 1 mounted on the conveyor mechanism 10. The passage of the coiled material onto the collapsible roll trough 20 initiates a series of actions which involves the expansion of opposed hydraulic motor mechanisms 31 and 36 toward the article which is positioned in exact centered relationship with respect to the centerline of conveyor mechanism 10. The roll trough mechanism is collapsed effecting a transfer of the coiled material onto the conveyor mechanism 10 which in turn carries the coiled material longitudinally and away from the wrapping machinery. During this entire operation the tail or last wrap of coiled article is maintained in tightly wound condition by reason of the contact of the various components thus far actuated with the bottom of the coil and this function is effectively performed by maintaining the center or axis of winding of the coil parallel to a horizontal plane.

As the coiled article approaches the discharge end of the conveyor assembly 10 a synchronized unloading mechanism 30 picks up the coil from the moving conveyor and transfers it longitudinally of the direction of movement of the conveyor up and away from the conveyor elements 1. After the last described action has been performed, a push-off mechanism 40 will be actuated to move the coil laterally of the path of the movement of conveyor assembly 10 onto a downending mechanism 50, at which time the coil may then be strapped to prevent subsequent unwinding. The downending mechanism will then move the coil through a 90° arc such that the axis of winding is disposed in a vertical plane. From this point other apparatus, forming no part of the presently disclosed invention, may be employed in such subsequent operations as may be desired.

Of the above described handling means, the downending mechanism 50, the specific bare conveyor mechanism 10 as well as the aforesaid elevator mechanism used in conjunction with the coiling apparatus form no part of the instant invention, the invention disclosed herein dealing with the handling and apparatus for handling of the coiled article from the time of its egress in coiled condition from the coiling apparatus or the like to that point at which the coiled material is unloaded from the conveyor mechanism and strapped to prevent unwanted springback.

In all cases the coiled article shown in the various figures of the drawings is designated by the reference numeral 15. In appreciating the significance of the mechanisms to be more particularly described hereinafter, it is believed worthy to note that such a coiled article can weigh in the neighborhood of 50 tons and may compass a diameter of up to 6 ft. while having an edge width of up to 80 inches. Thus, it can be seen that the article being handled is of extremely cumbersome size and weight. This size and weight is conducive to the occurrence of accidents and as well results in a difficult handling problem, which factors the novel apparatus and system disclosed effectively avoids and mitigates.

As will be more fully described hereinafter, the entire operation from the time that the coiled material passes from the belt wrapper elevator assembly onto the collapsible roll trough disclosed in Figure 1 may take place by automatic control means. From this point until the time at which the coiled material is deposited on the downending assembly the entire operation can be performed without the presence of personnel in immediate proximity to the apparatus either by automatic means as mentioned above, or by the control of an operator positioned in a station and having available controls to cause remote control operation of the individual components.

Referring again to Figure 2 and in particular Figure 3 along therewith it may be seen that the conveyor mechanism 10 as well as all of the components are mounted on a suitable frame-work designated generally as 60 comprising an assembly of structural members positioned on a suitable floor or foundation structure as required. The conveyor mechanism 10 includes suitable supports 5 affixed to the framework 60 and rail members 3 disposed on supports 5. In addition, the conveyor assembly 10 includes lower rail members 4 carried on support members 8 in turn affixed to the main body of the framework 60. The rails in turn guide and receive carts 1 which assume the configuration as shown clearly in the end view in Figure 4 and the side view thereof as seen in Figure 6. It is to be noted that the carts 1 have a V-shaped top surface 2 and have a plurality of wheels 6 as shown as four in number disposed on the four corners of the cart. As is clear from the drawings, two such carts 1 riding on the laterally spaced parallel rail members 3 are axially aligned and move synchronously the length of the conveyor mechanism 10 to transport the coiled article 15 throughout the length of the conveyor. Rail members 3 and 4 are each paired and fixed in parallel relation with respect to each other to receive and guide the carts 1 which, as described, operate in pairs to support the coiled article. Referring in particular to the lower rail members 4, it is to be noted that the wheels 6 contact rail members 4 and that the cart 1 is in inverted position as clearly shown in in Figure 4 of the drawings. The carts 1 in their aligned synchronized relation and movement are interconnected with similar movable aligned carts fore and aft of their direction of movement. Suitable sprockets 7 and 9 are connected by an endless tension means in a known manner to each of the series of carts 1 in such a manner that the carts 1 may be said to comprise an endless conveyor in which certain portions thereof, namely the V-shaped top surfaces, are adapted to receive spaced articles, namely the coiled articles 15. Thus the carts 1 are loaded, then pass along the top of rail members 3 to the discharge end of the conveyor as shown in Figures 1 and 7 and upon actuation of the unloading assembly designated generally at 30 the carts pass around aligned sprockets 9 and back toward the direction of initial loading point with the wheels 6 thereof in contact with lower rail members 4. With respect to the described conveyor system such a system is not new in and of itself. However, as used in combination with the various loading and unloading mechanisms to be hereinafter described, the entire assembly may be caused to function as an automatic or remote controlled loading, carrying and discharging transfer device for handling a coiled article of large size and cumbersome nature while accomplishing the objects as set forth hereinabove.

Referring now more particularly to Figures 2, 3, 4, 5 and 6 the collapsible roll trough assembly 20 and centering mechanisms employed in the presently disclosed system are clearly illustrated. The mechanism for raising and collapsing the roll trough assembly 20 comprises a pair of generally vertically extending arm elements 11 and 12 which have at their uppermost extremities suitable channel members 13 and 14. The arm elements 11 and 12 are mounted on and keyed to a pair of similar shaft members 16 and 17 journaled in framework 60 in trunnions 18 such that they may swing about a horizontal axis extending transversely to the direction of travel of the conveyor carts 1. Roller elements 19, all similar are rotatable about axes parallel to the path of movement of the conveyor carts 1 such that coiled material disposed on the top surfaces thereof may be moved laterally of the conveyor assembly 10 without the incurrence of unwanted and undesired friction and scratching action such as might render the coiled articles 15 unfit for further use. As has been stated, the lower ends of the respective arm elements 11 and 12 are journaled by means of shaft members 16 and 17 in trunnions 18 such that the arm elements are swingable in an arc toward and away from each other. The arm elements are formed in such a manner as to provide laterally spaced clearance portions such that the conveyor mechanism 10 may pass through the arms 11 and 12 when the arms approach the maximum vertical position in their arcuate path. Thus, the arm elements 11 and 12 are in three sections which project intermediate of and to either side of the spaced conveyor carts 1 thus forming in effect two groups 11 and 12 of three single arms affixed to and operated as respective units by shaft members 16 and 17 unobstructed by the passage of the conveyor assembly 10 through the arc of their swinging movement. Each group of arms 11 and 12 are provided at their free ends with a group of roller receiving channel members 13 and 14 respectively which are so arranged that the surfaces of the roller elements 19 on any group of arm elements, either 11 or 12 are in the same plane no matter in what position of their respective arcs of swinging they may be. Thus, in effect, there is formed a roller surface extending transversely of the conveyor and adapted to receive a coil and support the same intermediate of and to either side of the conveyor mechanism 10 as is clearly illustrated in Figures 4 and 5 of the drawings. The arm elements designated 11 and 12 are substantially identical to each other and are so reversed with respect to each other such that the angle at which the roll supporting channel members 13 are disposed toward the horizontal is opposite to the angle at which the roll supporting channel members 14 are disposed. The effect is thus to produce a transversely extending V-shaped roller trough which is adapted to support coiled article 15 to either side of and intermediate to the conveyor mechanism 10 as disclosed clearly in Figure 4. The resultant supporting surface has relatively friction-free properties, is adapted to contact the bottom surface and as will be explained, the tail or last convolution of the rolled material and allow the same to be moved laterally of the conveyor assembly 10. The effect of the resultant V or trough shaped surface is to confine the coiled material and prevent the same from rolling in either of the two directions opposite to the angle at which the trough sides are disposed.

In order to assure simultaneous movement of the arm elements 11 and 12 toward and away from each other in such a manner that the upper ends thereof swing in opposite directions about the centerline of shaft members 16 and 17, respectively, the shaft members 16 and 17 are provided with outwardly extending segmental gear members 21 and 22 which are provided with projecting gear teeth intermeshed at 23, the interengagement being effected by as many such segment portions on the arm elements 11 and 12 as may be necessary. Thus it may be seen that movement, for example of arm element 11 will produce equal and opposite movement in arm element 12. The effect of this arrangement is to cause the upper ends of the arm elements 11 and 12 as well as the oppositely facing portions of the roller surface to be raised and lowered with respect to the top surface 2 of the carts 1 in conveyor assembly 10. Thus, a coiled article 15 resting on the top surfaces of roller elements 19 while the arm elements 11 and 12 are in approximately vertical or raised position will be spaced from the carts 1 when in receiving position as is apparent from an inspection of Figures 3, 4 and 5 of the drawings. When arm elements 11 and 12 are swung in their arcuate path in equal and opposite directions, the coiled article 15 will be lowered onto the top surfaces of carts 1 when such carts are in receiving position as the free ends of the respective arm elements 11 and 12 pass beneath the generally horizontal plane at which the supporting surface on carts 1 will assume the load.

In all cases during the loading operations described as well as during the load centering operation, the load receiving and conveying carts 1 are at rest, i. e. the movement of the conveyor assembly 10 is interrupted, in such a manner that a given pair of the series of cooperating load conveying carts 1 are aligned in proper relation with respect to the collapsible roll trough assembly 20 so as to be able to receive the load, i. e. coiled article 15. In order to effect lowering and hence collapsing of the roll trough assembly 20 by the swinging action of arm elements 11 and 12 through rotation of shaft members 16 and 17 in trunnions 18, a double acting hydraulic motor mechanism 24 is connected to the centermost element 11' of the arm elements 11 by a suitable journal connection 25. The connection at 25 is to the extremity of a piston rod 26 opposite the extremity to which the piston (not shown) is affixed. The piston (not shown) fits within the cylinder barrel of hydraulic motor mechanism 24, which in turn is journaled at 27 on a suitable support 28, anchored to the framework 60. The hydraulic motor mechanism 24 may be expanded by a conventional hydraulic control means employing a hydraulic pump, a fluid reservoir and a conventional solenoid operated reversing valve.

It is to be noted that the journals 25 and 27 are so arranged that the hydraulic motor mechanism 24 may swing arcuately in a direction parallel to the direction of movement of the conveyor carts 1. Thus, upon actuation of a suitable hydraulic means, the motor mechanism 24 and thus the distance between journals 25 and 27 may be varied such that the arm elements 11 will be caused to be swung about trunnions 18. By reason of the interconnection of arm elements 11 to arm elements 12 through the medium of intermeshing segmental gear members 21 and 22 at 23, arm elements 12 affixed to shaft member 17 will be caused also to rotate in a manner opposite to the direction of rotation of arm elements 11. Thus by hydraulic action, the arms are swung upward such that roller elements 19 in turn supporting the coiled article 15 can be raised and lowered with respect to the conveyor carts 1 in such a manner that the article 15 may be lowered to a transport position with its bottom or tail portion resting on conveyor cart 1, the weight thereof having been transferred from rolls 19 by the retraction of the piston rod 26 of hydraulic motor mechanism 24 and the collapsing action of the roll trough assembly 20. It is to be noted that the roll trough assembly 20 is in raised position when the coiled article 15 is received from the winding or coiling apparatus.

Acting in conjunction with the collapsible roll trough assembly 20 is a coil or article centering apparatus comprising a pair of centering assemblies 70 and 80 disposed to either side of the conveyor as is clearly evidenced by an inspection of Figure 4.

One of these centering assemblies 70 is affixed to the framework 60 and comprises an inverted generally L-shaped heavy structural member 29 having a double acting hydraulic motor mechanism 31 suitably fastened by bolting or other means to the topmost portion thereof. The hydraulic motor mechanism 31 comprises a cylinder 31', and a piston rod 32 having a piston (not shown) at one extremity thereof, fitting within cylinder 31' and a pusher member 32' at the opposite extremity. When in retracted position, the pusher member 32' is so arranged so as to be outside of the maximum width of any coiled article which may possibly be carried on the conveyor mechanism 10. Disposed to the other side of the conveyor mechanism 10 and swingably mounted in such a manner as to be axially aligned in at least one position with respect to the centering assembly 70 is a second cooperating centering assembly 80. This assembly comprises an inverted L-shaped member 33 substantially identical in configuration with member 29 previously described, with the exception that the lower end of the structural member 33 is keyed in fixed relation to a shaft 34, in turn rotatable in spaced trunnion members 35, fixed in proper relation on framework 60, as is clear from an inspection of Figure 4. Thus, rotation of shaft 34 in trunnion members 35 will cause member 33 to swing in an arcuate path in a plane parallel to the direction of movement of the conveyor carts 1 between two positions as will be hereinafter described. At its uppermost end the L-shaped member 33 supports a double acting hydraulic motor mechanism 36 including a piston and pusher member unit 37, the structure at the topmost end of member 33 being substantially identical with the structure at the topmost end of member 29 and motor mechanism 31.

The shaft 34 described above is in turn connected to a double acting hydraulic motor 38 which has its barrel end connected by suitable journal means at 39 to the framework 60. The topmost and piston rod end of the hydraulic motor 38 is journaled at 41 to a lever 42 in turn keyed to rotatable shaft 34. Thus, expansion and contraction of the hydraulic motor 38 will cause the distance between journal means 39 and 41 to be varied thus causing a rocking movement of L-shaped member 33 and shaft 34 in trunnion member 35. Since L-shaped member 33 is thus rockably mounted on framework 60, rocking movement applied to the shaft 34 will cause the member 33 to be moved from a position as shown in dotted lines in Figure 3 to a position shown in full lines in response to expansion and contraction of the double acting hydraulic motor mechanism 36. The L-shaped member 33, shaft 34 and lever 42 thus comprise a bell crank assembly swingable in trunnion members 35 by the action of hydraulic motor 38.

The purpose of rockably mounting centering assembly 80 is that a coil of sheet material passed onto collapsible roll trough assembly 20 may clear the assembly 80 since this assembly 80 when in its actuated, i. e., article centering position, would be in line with and an obstruction to the lateral movement of coiled article 15 onto the elevator mechanism and collapsible roll trough assembly 20. Thus, at the time the coiled article is passed from the elevator extension as described in copending application S. N. 519,373, the centering assembly 80 is rocked in a counter-clockwise direction as viewed in Figure 3 until such time as the coil has passed onto the collapsible roll trough assembly 20 from the direction in which the figure is viewed. At that point, the swingable centering assembly 80 under the influence of hydraulic motor 38 is caused to move in a clockwise direction in such a manner that, as viewed in Figure 3, the hydraulic motor mechanism 36 with its associated pusher member unit 37 is in axial alignment transversely of the coiled article with the centering assembly 70 and thus pusher member 32' affixed to L-shaped structural member 29.

Referring now to that side of structural support assembly 60 upon which the stationary arm assembly 70 is fixed there is also a contact plate assembly 90. This assembly 90 comprises an upright structure 43 provided in fixed relation thereon with a plate member 44 mounted on compressible members 45 and adapted to be contacted by the edge of the laterally moving coiled article 15 as is apparent from an inspection of Figure 4. This plate member 44 is a contact plate which serves a double function, that is, it serves to cushion and stop the lateral passage of the coiled article 15 onto roller elements 19 from the elevator mechanism referred to in application S. N. 519,373, and secondly, it provides a suitable switch mechanism in a control circuit to be hereinafter described, such that upon contact of the coiled article 15 with member 44, suitable control means will be actuated which will in turn cause the expansion of hydraulic motor 38 with the resultant movement of centering assembly 80 and thus the hydraulic motor mechanism 36 and pusher member unit 37 swing into aligned position with respect to fixed centering assembly 70 and pusher member 32'. The circuit for accomplishing the automatic results recited will be more fully hereinafter described, though it must be appreciated that such action could just as well be controlled by suitable push button operation from a remote control station.

Considering now the pusher member units 32' and 37, it may be seen that these units engage the edges of the coiled article 15 after its lateral movement onto collapsible roll trough assembly 20 has been completed. It is also evident that hydraulic motor mechanisms 31 and 36 are so arranged with respect to the center line of the conveyor mechanism 10 that they will, upon actuation, move inwardly and laterally of the conveyor assembly 10 toward the center line thereof. Thus, any article disposed between pusher members 32' and 37 will be in effect compressed between the surfaces of these pusher members upon expansion of the hydraulic motor mechanisms 31 and 36. However, by the use of the hydraulic system and control means disclosed in Figure 15, the action of the pusher plate members 32 and 37 is such that the coiled material is centered with respect to the paired conveyor carts 1 and hence is accurately positioned with respect to the center line of the conveyor mechanism 10. The hydraulic circuit for effecting the centering action of the opposed cylinder hydraulic motor mechanisms 31 and 36 is clearly disclosed in Figure 15 and will be more fully described hereinafter.

Considering now the previously described roll trough assembly 20 and the hydraulic centering assemblies 70 and 80, it will be seen that the action of these units has been such that the coiled article 15 has been passed laterally onto elevator assembly 20 contacting plate 44 thus causing the actuation of centering assembly arm 80 such that this assembly has swung to axially, laterally aligned position with respect to centering assembly 70, the hydraulic motor mechanisms 31 and 36 have acted to center the coiled article on roll trough assembly 20 with a great degree of accuracy with respect to the conveyor mechanism 10 and in particular the conveyor carts 1 as shown in Figure 4. This action having been completed, the control mechanism to be hereinafter described allows the roll trough assembly 20, as actuated through the previously described hydraulic motor mechanism 24 to collapse thus lowering the coiled article 15 from its position on roller elements 19 to the V-shaped top surface 2 provided on the conveyor carts 1.

As soon as the material has been deposited on carts 1, it is moved longitudinally along the conveyor 10 toward the discharge point to be hereinafter described. The effect of this movement is to cause the roll trough assembly 20 to return to its raised position and also to cause the swingable centering assembly 80 to move back to its original retracted position out of the path of any coiled article discharged from the elevator mechanism described in copending application S. N. 519,373, such that the cycle of operation is completed and the receiving and transferring as well as centering apparatus are in a position of rest adapted to receive a new coil of sheet material and to repeat the process described hereinabove.

In the interim period the coiled article 15 deposited on conveyor cart 1 has been carried the length of the conveyor mechanism 10 and is approaching the discharge end of the conveyor where an unloading mechanism 30 is in position to receive the coiled article 15. Referring now in particular to Figures 7, 8, 9, 10 and 11, a novel unloading mechanism 30 is provided whereby the coil may be unloaded from conveyor carts 1 in such a manner that the continuous movement of the cart 1 along the conveyor mechanism 10 is in no way affected. Thus, the transfer of the coiled article 15 from the conveyor mechanism 10 is effected in a highly efficient manner which in no way disturbs the operation described with respect to the roll trough and centering assemblies 20, 70 and 80 described above.

The unloading mechanism comprises a movable table formed from longitudinal parallel side rail members 46 and 47, rigidly connected together by suitable cross members 51. The rail members 46 and 47 are arranged in such a manner as to extend parallel to and be laterally disposed to either side of the conveyor carts 1 as well as all elements of the conveyor mechanism 10. Cross members 51 as well as rail members 46 and 47 are formed of structural steel shapes welded or otherwise connected together such that their top edges are coplanar forming a rigid load supporting surface. On the top surfaces of the side rail members 46 and 47 are a series of roller elements 52, 52' similar to rollers 19 utilized on the collapsible roll trough assembly 20. These rollers 52, 52' are supported in inverted channel shaped roll supports 53, 54, 55 and 53', 54' and 55' which are disposed as shown on side rail members 46 and 47 and on structural members 48 and 49. Provisions are also made in such a manner that any given one of these rollers may be a load responsive switch, used as will be hereinafter described. The roller elements 52, 52' are grouped on the respective support members and the support members 53, 54, and 55 as well as 53', 54' and 55' are so spaced as to permit the movement of conveyor carts 1, inwardly of the conveyor end of the flat load supporting surface for the purpose to be hereinafter described. Thus, by the above described arrangement the conveyor carts 1 may pass between the roller assemblies intermediate the lateral extent of the friction free trough shaped surface formed thereby in such a manner that the coiled article 15 carried by the carts 1 reach a position such that its horizontally disposed center or axis of winding will pass through and be vertically aligned in a plane passing vertically through the apex of the angular surfaces formed by the rolls 52, 52'.

Reference again is made to roller supports 53, 54 and 55, which it may be seen are fixed to the load supporting surface so as to be disposed at an angle. The supports 53', 54' and 55' are disposed at a similar angle but face toward the supports 53, 54 and 55. The resultant surface is thus a V-shaped roller trough wherein the axis of rotation of the roller members is aligned with the direction of movement of the conveyor carts 1 and thus coiled article 15. The purpose of this arrangement will become apparent when the operation of the unloading device 30 is more fully explained.

The load supporting surface formed by structural shapes 46, 47, 48, 49 and 51 is supported on a plurality of similarly paired rocking legs 56 and 57. Legs 56 are laterally spaced and journaled at their lowermost ends in trunnions 58 by means of a shaft 59 to which they are keyed or otherwise fixed in such a manner that these arms are disposed in a common plane which may be said to be swingable about the center of shaft 59 in a direction paralleling the direction of movement of conveyor carts 1. The upper ends of the rocking legs 56 are connected by suitable journal members 61 to the lowermost faces of side rail members 46 and 47 at the ends of these members most adjacent to the conveyor mechanism 10. Similar paired rocking legs 57 are keyed to a shaft 62 at their lowermost ends, the shaft 62 being in turn journaled in trunnions 63 fixed to the same floor or foundation as are trunnions 58. Thus, the rocking legs 57 are swingable in a manner similar to legs 56 and are, as will be seen, always parallel to legs 56 in any position. Legs 57 are connected by journaled connections 63' to the side rail members 46 and 47 in a manner similar to the connections between legs 56 and members 46 and 47.

The entire unloading mechanism 30 including members 46, 47, 48, 49, etc., 53, 54, etc., and legs 56 and 57 forms a rocking load support which by reason of the journaled connections between rocking legs and the base or floor structure is capable of swinging in an arcuate path longitudinally toward and away from the discharge end of the conveyor mechanism 10. Rocking legs 57 are interconnected by means of laterally extending structural members 64 and 65. Member 64 has a trunnion 66 provided thereon substantially midway of its ends and to which is connected the piston rod end of a double acting hydraulic actuation means having a piston rod 67 and piston (not shown) extensively movable within a cylinder 68. This cylinder 68 is pivotally mounted on cross pivots 69 of any conventional design suitably supported on the foundation or framework 60 by suitable structural means and may pivot in a plane normal to the direction movement of rocking legs 56 and 57 or may be movable about pivots 69 in the same plane in which the center line of the rocking table structure formed by members 46, 47 would be movable. The double acting hydraulic motor assembly including cylinder 68 and piston rod 67, will thus, upon expansion or contraction be effective to rock the article supporting surface toward and away from the end of conveyor mechanism 10. Referring now to the surface of the movable structure, it may be seen that a transversely extending spring biased abutment assembly 71 is provided which includes spring impact absorbing elements 72 having roller surfaces 73. As is evident from an inspection of Figures 7, 8, 11 and 14, the roller surfaces 73 are positioned in the path of the moving conveyor carts 1 such that as the carts 1 move toward the sprocket 9 and discharge end of conveyor mechanism 10, the leading edge of the article carrying carts 1 will contact the roller surfaces 73. Since the carts are moving at a fairly high rate of speed along the rail members 3, an impact force is created by contact with abutment assembly 71 which impact creates a reaction equal and opposite to the direction of movement of any one conveyor cart 1. This reaction causes the rockable article unloading mechanism 30 to tend to move in the direction of travel of the carts 1. In so doing, by reason of the length of the rocking legs 56 and 57, the article receiving trough as defined by roller elements 52 and 52' will tend to rise or move upwardly in an arcuate path with respect to the surface of conveyor carts 1 in such a manner that the roller elements 52, 52' will engage the lowermost surface of the coiled article 15 and thus lift the coiled article from cart 1, which then passes around sprocket 9 and back along lower rail members 4 to be loaded again as is conventional.

The importance of the double acting hydraulic motor comprising piston rod 67 and cylinder 68 will now become apparent. At a predetermined time prior to contact of a conveyor cart 1 with the abutment assembly 71, the motor assembly is provided with a pre-load hydraulic pressure which tends to force the piston (not shown) and piston rod 67 in cylinder 68 in a direction so as to rock the unloading mechanism 30 from its position of rest as shown in Figure 8 to its article carrying and transfer position as shown in Figure 10. The pre-load pressure applied to the hydraulic motor is of sufficient magnitude such that this force coupled with an impact force in a manner to be described will be effective to rock unloading mechanism 30 away from the end of conveyor mechanism 10. Thus, the necessary force to cause the unloading mechanism 30 to act in the above-described manner is produced by the impact of conveyor carts 1 with abutment assembly 71. The pre-load pressure, the speed of the carts 1 and the shock absorbing characteristics of abutment assembly 71 are all so co-related that the force produced by the aforesaid impact of cart 1 with abutment assembly 71 produces enough reaction in unloading mechanism 30, to not only drive the unloading mechanism away from the end of the conveyor mechanism 10, but also, in so doing, to be able to lift, support and transfer the coiled article 15 during the movement. The rocking action of unloading mechanism 30 also causes the article contacting roller elements 52 and 52' to move upward and longitudinally of the conveyor mechanism 10 and to contact the lowermost surface of coiled article 15. The length of rocking legs 56 and 57 and the position of abutment assembly 71 are so fixed as to cause a momentarily synchronous longitudinal movement between conveyor cart 1 and roller elements 52 and 52' at the point of contact of roller elements 52 and 52' with the lowermost surface of the coiled article 15. At this instant the load transfer action is initiated and almost simultaneously ends, since the roller elements 52 and 52' on assembly 30 are moving in an elliptical path upwardly and away from the end of cart 1 and the particular motion producing cart is moving downwardly and longitudinally toward the sprocket 9.

The unloading mechanism 30 then continues its rocking action with the coiled article 15 supported on roller element 52 and 52' until it reaches the position shown in Figure 10, i. e., a position where the horizontally disposed axis of coiling of the article is in the same vertical plane as is a push-off plate on pneumatically operated push-off mechanism 40 to be hereinafter described. Further, the lower surface of the coiled article 15 is positioned in such a manner as to be in the same planes as those containing the V-shaped roller surfaces of a conventional down-ending mechanism 50.

In order to prevent collapse of the unloading mechanism 30 in its article awaiting position as shown in Figure 8, suitable stop means may be provided to relieve somewhat the pressures on the hydraulic cylinder 68 and piston shaft seals (not shown). The stop means may take the form of a beam 74 welded or otherwise fastened to conveyor frame 60.

A suitable limit means, of which there are many conventional arrangements in the art, may be employed in conjunction with the piston rod 67 and hydraulic cylinder 68 to prevent undue expansion of the motor and thus control the arc through which unloading mechanism 30 will swing away from conveyor mechanism 10.

It is to be noted, also, that in the push-off position of unloading mechanism 30 with respect to push-off mechanism 40, the rocking legs 56 and 57 have swung past the vertical or dead center position. Hence the hydraulic motor is of the double acting type whereby pressure applied to piston rod side of the usual piston (not shown) within cylinder 68 will cause retraction of piston rod 67 to return the unloading mechanism 30 to its unloaded, initial position with respect to conveyor mechanism 10.

Thus, it may be seen that the instant system incorporates a transfer apparatus adapted to pick up a coiled article from a movable conveyor assembly "on the fly" without interrupting the movement of the conveyor carts 1 and without interfering in any manner with the movement of the conveyor mechanism 10. It is also apparent that the centering assemblies 70 and 80 as previously described with reference to Figures 3, 4, etc., are of significant importance and contribute materially to the action of the transfer table in that the coiled article as it passes onto the transfer table is centered in such a manner as to be accurately placed in the trough formed by the surfaces of roller elements 52, 52'. Since the only necessity for stopping the movement of the endless conveyor mechanism 10, and thus the longitudinally moving carts 1 as has been pointed out, is during the loading operation at the loading and centering end of the conveyor mechanism 20, the longitudinal spacing of the carts is so arranged that in the event, for example, a second coiled article were to be loaded before a first article was unloaded by unloading device 30, the previously loaded carts 1 would be stopped at a sufficient distance from the abutment assembly 71 so as to, when the movement again is initiated, contact the abutment with sufficient speed and force to impart the necessary motion to unloading device 30.

The unloading is an extremely efficient operation and at its completion the coiled article 15 is accurately positioned with respect to push off mechanism 40.

In the described system the overall efficiency is to be credited to a great extent on the fact that the conveyor carts 1 need be stopped at only one station, i. e., the loading and centering position. This results from the novel arrangement and device incorporated at the unloading station. The effect of the described arrangement is a complete avoidance of inefficiency resulting from prior art systems, wherein two stopping points are generally required. Attendant with the latter arrangements are difficulties arising by reason of the necessity of providing closely timed operations whereby the conveyor would be unloaded at one point while loading at another simultaneously. Such operations are always subject to error, missed cycles of operation and the like, all of which are avoided in the instant system and by means of the novel loading, centering and unloading apparatus and devices employed.

Referring now in particular to Figures 9, 12 and 13, the pneumatic push off mechanism 40 is shown as comprising a vertical standard 75, a horizontally extending member 76, and a diagonal brace means 77 all formed of steel structural shapes. Suitably mounted on the inner faces of an inverted channel member 76' by bolts or other fastening means is a series of rollers 78 having all of their axes disposed in a common plane. A downwardly facing channel member 79 has guides 81 disposed to either side of the outer faces of its flanges and engageable with rollers 78. The channel member 79, reinforced by spaced flange-like members 79', thus resembles an inverted drawer mounted on roller guides 81. In section, the oppositely facing channel members resemble a box having slidably connected parts. Within the box-like section is a double acting pneumatic air motor 82 anchored at its cylinder end to channel member 76' by a bracket 83.

Air motor 82 is also connected to a push plate 85 at 84. The push plate 85 is in turn fastened to channel member 79. Thus expansion and contraction of the air motor 82 telescopes the oppositely facing channel members such that push plate 85 will contact and push off a coiled article 15, deposited on unloading mechanism 30 and move it into position on downending mechanism 50. The use of the telescoping channel members 76' and 79 with associated rollers 78 and guides 81 assures true horizontal and reciprocatory action of push plate 85 as it engages the lateral face of the coiled article 15. Due to the fact that the coiled article is supported on roller elements 52 and 52' of the unloading mechanism 30, etc., and that the roller elements 52 and 52' are positioned in such a manner as to facilitate lateral movement of the coiled article, the coiled article 15 will be discharged laterally of the transfer table onto the downending mechanism 50 which as has been stated hereinbefore forms no part of the instant invention.

It is worthy to note in considering the objects of the invention stated, that it is at this point that the coil may be strapped such as to prevent unwinding of the last wrapping thereof during subsequent handling operations. Of particular significance is the fact that prior to the time of transfer into the downending mechanism the coil has been held in such a position that the last wrap or tail portion thereof has been in firm contact with the spirally wound article and that unwrapping thereof has been prevented. This condition and position of the coiled article has been maintained from the time of its egress from the belt wrapper onto the conveyor assembly through the centering operation during the entire time of transport from one end of the conveyor device to another and also during the time of transfer from the conveyor onto the downending device by means of unloading mechanism 30 and push-off mechanism 40. Thus, there has been devised a system of conveying coil sheet material which obviates the difficulties mentioned above and at the same time has been effective in removing any station requiring manual handling of the coiled article until such time as the article is conveyed a considerable distance away from and out of what may be considered the danger zone around the sheet coiling as well as the discharging mechanism disclosed in copending application S. N. 519,373, and the previously identified Wood patent.

In addition, the apparatus described is effective to accomplish the objects and advantages as set forth in the specification and to enable efficient and rapid handling of coiled material after its passage through a mill and its wrapping operation of the above-mentioned belt wrappers. The apparatus additionally avoids scratching, bending or other mutilation which could render the article unfit for use.

Considering now the various power operated components described above it is to be noted that the conveyor assembly is powered by a suitable prime mover and transmission 100 as is conventional. Similarly, the hydraulic motors 38, 31 and 36 are provided with the usual inlet and outlets as required by such double acting devices, as is air motor 82. All such mechanisms are supplied from a source or sources of fluid pressure, including suitable pumps and reservoirs which is conventional. Similarly, all power components are per se readily available units which may be purchased on the open market.

Having now described completely the mechanical and structural features as well as broadly the general operation of the system and its individual components, the form that the various hydraulic and electrical circuits may take to effect automatic operation will be described in detail. It may be appreciated that, however, the instant apparatus and system is not necessarily limited to use with automatic controls in all cases.

Each hydraulic system will be described individually to avoid confusion, after which the electrical circuits for controlling the various motors, valves, parts, etc., will be fully explained.

In view of the fact that the article centering device is the initial step in the operation of the system and in view of the fact that the structure of the article centering mechanism and operation was first described, reference is made in particular to Figure 15 wherein there is disclosed a hydraulic system for controlling the various hydraulic mechanisms essential to accomplish automatic passage and centering of the coiled article 15 onto the conveyor mechanism 10. Considering the schematic article centering hydraulic system, it may be seen that piston rods and pusher members 32, 32' and 37 are retracted prior to the centering operation. Upon entry of coiled article 15 on collapsible roll trough assembly 20, a solenoid B on a solenoid operated centering valve 167 is energized by suitable electrical means to provide a direct connection between a source of hydraulic fluid pressure P in conduit 147 with conduit 162. Also, a direct connection is established between conduit 159 and conduit 166 to the hydraulic reservoir R. Thus, it may be seen that pressure can be applied to the end of the cylinder of hydraulic motor 38 opposite to the piston rod end. The fluid displaced in the opposite or piston rod end of cylinder of hydraulic motor 38 can flow out through a remotely controlled sequence check valve 168, thus providing free flow in the direction of the arrow FF as indicated. This action permits the fluid to pass through conduit 159', conduit 159 and solenoid operated centering valve 167 to the reservoir return line 16. The flow of fluid forces the piston rod of hydraulic motor 38 out of the cylinder. Due to the fact that the piston rod end of hydraulic motor 38 is connected to lever 42 on movable centering arm assembly 80, this assembly along with hydraulic motor mechanism 36 is moved into a coil centering position as shown clearly in Figure 4. At the instant that the piston rod has begun to move out of the cylinder of hydraulic motor 38 the pressure in conduit 162 is not sufficient to actuate a directly operated sequence check valve 163 which is set so as to open only when a predetermined pressure is exceeded. However, once the piston rod has been forced out of hydraulic motor 38 to its fullest extent the pressure in conduit 162 builds up to a value above that at which valve 163 is set to open. Fluid then passes through valve 163, line 164 to conduits 169 and 161. From conduit 169 the fluid passes through a constant displacement fluid motor or pump 171 and thence through a conduit 172 to the end of hydraulic cylinder 31' on centering assembly 70 opposite to the piston rod end. Fluid displaced from the piston rod end of cylinder 31' passes through conduits 144' and 144 and also sequence valve 140 which allows free flow in a direction indicated FF to conduit 159. From conduit 159 the fluid passes to valve 167 to the reservoir return conduit 166.

Similarly, fluid in conduit 161 passes through a second fluid motor 141 which is identical to fluid motor 171. It is to be noted, at this point, that the fluid motors or pumps are coupled together by a shaft coupling means 142. Thus, the two motors or pumps must at all times rotate at identical speeds. The purpose of this arrangement will be apparent as the present descriptive matter of the system is continued. From motor 141 the fluid passes through conduit 143 to the end of the cylinder of hydraulic motor mechanism 36 opposite to the piston rod end. Fluid displaced from the piston rod end of hydraulic motor mechanism 36 flows out conduit 144 and through sequence valve 140. Thus, each of pusher member units 32 and 37 of hydraulic motor mechanism 31 and 36 is forced out toward the coiled article 15. If the fluid motors 171 and 141 were not employed the piston of the cylinder having the least load would move out a greater distance than the cylinder having the greater load and there would be no centering of the coiled article 15 with respect to the conveyor mechanism 10 and the system would act in the following manner.

The coil would roll down onto roll trough assembly 20 and rest against plate member 44, the function of which will hereinafter be described. Pusher member 32' would touch the coil first and due to the resistance of the coil against movement, all of the fluid would flow into hydraulic motor mechanism 36, thus forcing out the piston rod and pusher member unit 37 until it contacted the coiled article 15. The article 15 would not be centered over the conveyor carts shown schematically, but would be positioned toward plate member 44. Thus, no centering of coiled article 15 relative to the center line of conveyor mechanism 10 would be accomplished.

By the provision of and use of the motors 171 and 141 coupled together at 142, it may be seen that the same amount of fluid is forced through conduit 172 as conduit 143. This is effected by reason of the fact that the fluid, for example, flowing at a faster rate through conduit 143 than in conduit 172 would speed up the rotation of the shaft of motor 141. The result of the change in speed of motor 141 and thus in the rotation of the shaft coupling means 142 would be to increase the shaft speed of fluid motor 171 to the same speed causing an increase in fluid passing through conduit 172. Conversely, the tendency of the fluid not to flow through conduit 172 would be effective to cause an even rate of flow through conduits 172 and 143. Thus, the fluid flows in hydraulic motor mechanism 31 and 36 at the same rate whereby pusher member units 32 and 37 are displaced at identically the same rate centering the coiled article 15 with respect to the conveyor mechanism 10.

It is believed important to make mention at this time that a suitable by-pass arrangement is provided whereby after the centering operation and during the retraction of the piston and pusher member units 32 and 37, respectively, motors 141 or 171 will be prevented from sucking air, should the retraction of one of the abovementioned units 32 or 37 be completed prior to the other. A by-pass valve 149 is actuated to provide a connection between line 152 and the pump P and the pilot connection on the pilot operated sequence valve 145 to effect opening of valve 145. The opening of this latter valve provides a by-pass around fluid motors 171 and 141. It is apparent that without such an arrangement one of the fluid motors, either 171 or 141, would suck air if one or the other of the piston and pusher member units 32 or 37 were completely retracted prior to the other.

Referring now in particular to Figure 18 which is a ladder schematic electric circuit of the instrumentalities used to control the hydraulic system previously described, the automatic operation of the coil centering and conveyor loading operation will now be described. At the beginning of operation piston rod and pusher members 32' and 37 are retracted whereby limit switches 205 and 206 are closed resulting in the energization of relays 209 and 210, respectively. Also, the hydraulic motor 38 is in the retracted position, whereby a limit switch 211 is closed energizing relays 214 and 215. When a coiled article 15 rolls onto collapsible roll trough assembly 20 and strikes the contact plate member 44, an electronic relay 202 is actuated closing contacts 203 thereby energizing a timer relay 204. This results in the closing of contact 204b and holding contact 204a which maintains relay 204 energized.

The closing of contact 204b energizes relays 218 and 219 through normally closed contacts 204c, 224a and 227b. The energization of relay 218 closes suitably open contacts (not shown) energizing solenoid B on coil centering valve 167. As previously described, this provides a direct connection between the source of hydraulic fluid pressure in conduit 147 and conduit 162. Also, a direct connection between conduits 159, 166 is completed to the hydraulic reservoir R. Thus, pressure may be applied to the end of hydraulic motor 38 opposite the piston rod end. The fluid displaced in the opposite end of the hydraulic motor 38 can flow out sequence check valve 168 which has free flow in the direction of the arrows FF. This permits the fluid to flow through conduit 159′, conduit 159 and valve 167 to reservoir return conduit 166. The flow of fluid forces the piston rod out of the cylinder of hydraulic motor 38. Since the piston rod is connected to the movable centering assembly 80 and hydraulic motor mechanism 36 carried thereon, hydraulic motor mechanism 36 is moved into coil centering position as shown in the drawings.

As soon as the piston rod begins to move out and away from hydraulic motor mechanism 38, limit switch 211 is opened thereby deenergizing limit switch relays 214 and 215. As long as the piston rod is being forced out, the pressure in conduit 162 is insufficient to open a directly operated sequence and check valve 163. As described, this valve will open only when a predetermined pressure is exceeded. Once this piston rod is extended to its fullest extent, the pressure builds up in the conduit 162 in a sufficient amount to open valve 163. The fluid then passes through conduits 164 and so forth as has been described in the operation of the hydraulic system above.

Referring once again to the electrical circuit disclosed in Figure 18, it may be seen that once the coil is clamped between the heads of pusher member units 32′ and 37, hydraulic motor mechanism 31 and 36 are unable to effect movement in any manner which results in increased pressure in conduit 164 and valve 163 thus closing pressure responsive switch IPS. The closing of this switch energizes relay 224 which opens a normally closed contact 224a in line 269b and closes a normally open contact 224d in line 271. The opening of contact 224a deenergizes relays 218 and 219. Deenergization of relay 218 opens the circuit to solenoid B on centering valve 167 whereby the valve is centered by the usual oppositely acting centering springs closing all ports. The movement of the pistons and thus pusher member units 32′ and 37 away from their retracted positions has opened limit switches 205 and 206 thereby deenergizing relays 209 and 210 which effects closure of normally closed contacts 209a and 210a in line 272d. When relay 219 has been deenergized by the opening of a contact 224a in line 269b as described, it is effective to allow closure of a normally closed contact 219a in line 272d thereby deenergizing a relay 226 effective to open the circuit through fluid motor by-pass valve 149 to the pilot connection sequence valve 145. This opens the by-pass around fluid motors 141 and 171 preventing any one of the fluid motors from sucking air should one of the pusher member units 32 or 37 be retracted prior to the other.

Continuing on with the description of the electrical circuit it may be seen that when normally open contact 224d in line 271 is closed it is effective to energize relay 227 closing a holding contact 227a on line 271b maintaining relay 227 in energized condition. Energization of relay 227 is effective to cause energization of solenoid A of the hydraulic solenoid operated valve 167 to make connection between conduits 147 and 159 and between conduits 162 and 166 in the manner previously described. In addition, energization of relay 227 may be effective to operate a suitable braking means such as brake shoe 86 to cause it to contact at least one set of roller elements 19. From Figures 4 and 5 of the drawings it will be seen that roller elements 19 support coiled article 15 at an angle. Thus, retraction of pusher members 32′ and 37 would result in movement of coiled article 15 to the left of Figures 4 and 5. By effecting operation of a suitable braking means such as brake shoe 86 upon centering of the coiled article 15, such movement upon retraction of pusher members 32′ and 37 is prevented. Brake shoe 86 may be actuated by a suitable solenoid (not shown) which in turn is actuated by closing suitable contacts (not shown) in the line to such solenoid upon energization of relay 227.

The action of the hydraulic system as described results in a pressure drop in the conduit 164 which opens pressure switch IPS closing normally closed contacts 224a in line 269b which would again energize relay 218. However, shortly after the pusher member units 32′ and 37 have clamped the article 15, a timer operated contact 204c in line 269a opens preventing energization of relays 218 and 219. As long as solenoid valve 146 is deenergized, it is spring biased in the usual manner to maintain it in a centered position whereby conduit 151 from pump P is blocked.

The energization of relay 224 has closed contact 224c in line 269e thus energizing IPS timer relay 228. This is effective to immediately close a holding contact 228a in line 269f which locks the timer relay 228 in the circuit through a normally closed switch 230a. This switch 230a is operated by relay 230 which is energized only when limit switch 231 in line 250a is closed by the down position of the roll trough assembly 20. Switch 231 is closed only when the collapsible V-trough assembly 20 is in the down position. In view of the fact that the collapsible V-trough assembly is in the up position during the centering, relay 230 is not energized and thus normally closed switch 230a on line 269f is closed. The energizing of the coil 224 also closes a normally open contact 224e in line 272b. This is effective to energize relay 233 through a timer contact 228 in line 272b and normally closed contact 240a in line 272a. The energization of relay 233 closes a holding contact 233a maintaining energization of relay 233. The energization of relay 233 is effective to energize the solenoid A of solenoid operated valve 146 to make direct connection between the pump P through hydraulic lines 151 and 148 to the pilot connection of valve 140 opening valve 140 thereby permitting fluid to flow from pump P into the piston rod ends of hydraulic motor mechanisms 31 and 36, retracting pusher members 32′ and 37.

As the pusher members 32′ and 37 on centering assemblies 70 and 80 begin to retract the timer contact 228b in line 272b opens thereby deenergizing coil 233, in turn deenergizing solenoid A of the solenoid valve 146 returning it to its centered position, thus effecting the opening of conduits 148 and 148′ to the reservoir return line 153 closing pilot operated valve 140 and stopping retraction of pusher members 32′ and 37. Stopping retraction of pusher members 32′ and 37 provides an opportunity for the operator to see whether the braking means on roller elements 19 e. g. brake shoe 86 is functioning to maintain coiled article 15 in the centered position on the roll trough assembly 20. At the same time, the timer relay 228 closes switch 228c in line 254 whereby relay 237 is energized and is effective to control a suitable solenoid valve (not shown) which may be similar to valve 167 to allow pressure to be exerted on the piston rod end of the hydraulic motor mechanism 24 to lower the collapsible roll trough assembly 20 whereby the coiled article 15 is deposited on a conveyor cart 1. The retraction of the roll trough assembly 20 closes a normally open switch 231 energizing relays 230 and 236. The resultant energization of relay 230 opens normally closed contact 230a in line 269f, thereby deenergizing relay 228 allowing contact 228b in line 272b to close while opening contacts 228c. However, coil 237 does not become deenergized since timer operated contacts 239b actuated by conveyor carts are set to close at a time subsequent to closing contacts 228c and prior to the above-mentioned opening of contacts 228c. Closing contacts 228b energizes relay 233 through contacts 209a, 210a and 238a which are normally closed. This is effective to energize solenoid A of the solenoid valve 146 to thereby complete retraction of the pistons and pusher members 32′ and 37.

As soon as the pusher members 32′ and 37 are retracted, each respective limit switch 205 and 206 is closed thus energizing each respective relay 209 and 210. As soon as both pusher members have been retracted completely, and both relays 209 and 210 are energized, contacts 209a and 210a are open, thus deenergizing relay 233 since contacts 236a were opened by the energizing of relay 236 by the closing of switch 231 through retraction of roll trough assembly 20. Deenergizing of relay 233 returns the solenoid operated valve 146 to a neutral position.

Opening of contacts 209a also deenergizes relay 226 closing fluid motor by-pass valve 144. Energizing relays 209 and 210 closes normally open contacts 209b and 210b in line 273a while deenergizing relay 233 closes normally closed contacts 233a also in line 273 which completes the circuit to relay 240 energizing the same through normally closed contact 215a and normally open contacts 230b which are closed by the energizing of relay 230. This closes the circuit to solenoid B of valve 146 moving valve 146 to a position which provides direct connection between hydraulic conduits 148′ and 151. This opens pilot operated sequence check valve 168 permitting fluid to flow to the piston rod end of hydraulic motor 38 whereby it is so actuated as to swing centering assembly 80 back to its position of rest as shown in dotted lines in Figure 3. As soon as this retraction is complete, limit switch 211 is closed energizing relays 214 and 215. This is effective to open normally closed contact 215a in line 273d deenergizing coil 240 which in turn deenergizes solenoid B of the hydraulic control valve 146 thus dropping the hydraulic pilot pressure on valve 168 and closing this valve. The closing of the switch 211 and energization of relay 214 also opens the normally closed contact 214a in line 271b thereby opening the holding circuit to relay 227, releasing brake shoe 86 and deenergizing solenoid A of solenoid valve 167.

In the meantime, the conveyor has been actuated in a suitable manner to move coiled article 15 and a cart 1 away from the station opening contacts 239, line 255a closing contacts 239a line 254 and resetting the timer operated contacts 239b opening same. As coiled article 15 moves away another cart 1 is progressing into position. Upon reaching the proper position normally open contact 239 in line 255a is closed normally closed contact 239a in line 254 is opened and the timer which eventually closes contacts 239b starts running. Closing contacts 239 line 255a energizes a coil 245 causing the raising of the roll trough assembly 20 to coil receiving position as shown in Figures 3 and 20, in particular. The timer relay 204 may be reset by the action of the medium used to unload a coiled article 15 from a coiling device to energize the circuit for action in response to contact of the article with contact plate 44.

Thus it may be seen from the above description of the electrical and hydraulic control means used in the centering operation that the entire operation is completely automatic once the conveyor cart 1 to receive a coiled article is stopped in a position in alignment with the discharging means disclosed in copending application Serial No. 519,373, filed July 1, 1955. The initial cycle is begun when the coiled article 15 moving laterally across the collapsible roll trough assembly contacts the plate member 44 carried on the structural member 29 of the centering assembly 70. The contact of the coiled article 15 with the plate member 44 is effective to institute the above-described cyclic electrical and hydraulic operation whereby the swingable centering assembly 80 is moved into its article centering position in the manner described previously. The hydraulic cylinder assemblies and thus pusher member 32 and 37 are forced laterally inwardly toward the coiled article 15 and in the manner described are effective to center the coiled article with respect to the conveyor assembly 1. In response to the increased pressure effective by reason of the mutually opposed forces generated in hydraulic motor mechanism 31 and 36, the coiled article is centered with respect to the conveyor assembly and the increased pressure is effective through the hydraulic system and the medium of the electrical circuit described to cause the reversal of hydraulic motor mechanisms 31 and 36. Thus, the pusher members 32 and 37 are retracted and at the time of their retraction the collapsible roll trough assembly 20 is lowered thus allowing the coiled article to be deposited on the conveyor carts 1. Movement of the conveyor carts 1 in the manner previously described is effective to carry the coil toward the discharge and unloader end of the conveyor mechanism 10. As has also been described, all valves and electrical controls are returned to their initial condition such that upon contact of a further coiled article 15 with plate member 44, the above described process will be automatically completed each time an article is to be centered with respect to the conveyor mechanism 10.

Referring in particular to Figure 16 there is disclosed a schematic drawing of the hydraulic circuit used in conjunction with the impact force resulting from the contact of a loaded conveyor cart 1 with the abutment assembly 71 whereby the unloading mechanism 30 at the discharge end of conveyor mechanism 10 will be caused to move from its unloaded position as viewed in Figure 8 to a transfer position as shown in Figure 10 whereby the coiled article 15 may be engaged by push-off mechanism 40 as has been previously described. Prior to discussing the completed schematic diagram of the hydraulic circuit a brief description of solenoid operated valve 300 is believed necessary. The valve 300 has three positions, a position to the left as viewed in the diagram when solenoid A is energized, a position to the right when solenoid B is energized, and a middle position when neither solenoid is energized. By usual spring loading means these valves are maintained in the centered position except when one or the other of the solenoids is energized and during this centered position all ports into and out of the valve are closed. Such a solenoid operated valve is in and of itself not new and may be purchased on the open market.

Considering then the action of the valve 300 it may be seen that when solenoid A is energized a direct connection is made between a port 301 and port 302 and a further direct connection is made between port 303 and a hydraulic reservoir designated as R.

When solenoid B is energized a direct connection is made between port 301 and port 303 and also between port 302 and the hydraulic reservoir R. Considering now the entire circuit it may be seen that hydraulic fluid is pumped from the reservoir R by means of a pump P driven by a motor M through a suitable solenoid operated relief valve 304. From relief valve 304 the fluid passes through conduit 305 and conduit 306 to a flow control valve 307. From the flow control valve 307 fluid passes to the piston rod side of the unloader cylinder 68.

Two flow control valves 307 and 312 are shown, both of which operated in the same manner in that the flow in the direction of the arrow is completely free while flow in the reverse direction is restricted.

Fluid from the relief valve 304 in conduit 305 also flows through line 308 to the previously described solenoid valve 300.

When the unloading mechanism 30 is in the position of rest prior to the unloading operation as shown in Figure 8 of the drawings, solenoid A of valve 300 is energized thereby providing a direct passage from port 301 in conduit 308 to port 302 in conduit 309. Direct passage is also effected between the reservoir R, reservoir conduit 310 and port 303 which is provided with a plug 311. In view of the fact that port 303 is plugged, the connection between reservoir R and the port has no effect. Thus the fluid passing through conduit 309 passes through flow control valve 312 which as indicated also permits free flow of the fluid in the direction of the arrow but provides restricted flow in a direction opposite to the direction of the arrow shown. The fluid passing through flow control valve 312 in line 309 passes to unloader cylinder 68 on the side of a piston 313 opposite to that side of the piston connected to a piston rod 67. Since that side of the piston 313 is connected to the piston rod 67 while the other side is not, the effective area on the piston rod side of the piston 313 is less than the effective area on the side opposite and thus a differential force is applied to the piston 313. The piston and cylinder are so designed that this differential is equal to a 100 lb. force tending to move the piston 313 in the direction of piston rod 67. This force is imparted to unloading mechanism 30 through the piston rod 67 and the trunnion 66 and is the preload pressure referred to in the prior description of the unloading mechanism 30.

When a coil car 1 strikes the abutment assembly 71 the combination of the impact force and the 100 lb. force exerted on the piston 313 is enough to overcome the force of gravity and move the unloading mechanism 30 and the coiled article 15 resting thereon to a position shown in dotted lines on Figure 8 wherein the coiled article 15 may be engaged and pushed off of the unloading mechanism 30 by the push-off mechanism 40 as has been previously indicated. After the coiled article 15 has been unloaded solenoid B of valve 300 is energized in a manner to be described in conjunction with the electrical diagram as shown in Figure 19, such that port 301 and conduit 308 are connected to port 303 which is plugged as indicated by a plug 311, while port 302 and conduit 309 are directly connected to the reservoir through the line 310. This permits the hydraulic fluid on the side of the piston 313 away from the piston rod 67 to flow to the reservoir R while pressure is still exerted on the piston rod side of the piston 313 through lines 306 and 306' thereby moving piston 313 to its fully retracted position thus returning the unloading device 30 to the position as has been shown in conjunction with Figure 8 of the drawings.

The hydraulic conduit 305 may, if desired, be interconnected to the usual hydraulic cylinder on downending mechanism 5 if desired. However, this arrangement is not shown since it is entirely feasible that the unloading mechanism 30 and push-off mechanism 40 could act to place the article 15 on other mechanisms than the downending mechanism 50.

Attention is now directed to the diagram for the pneumatic circuit utilized in operating the coil push-off mechanism 40 used in conjunction with the downending mechanism designated generally at 50. It is to be noted that the coil push-off mechanism 40 is pneumatically rather than hydraulically operated and that the air motor 82 is a piston and cylinder arrangement as has been previously indicated. The air motor 82 is actuated by energizing a solenoid valve 315 as will be described which provides a direct connection between an air supply P, not shown, air supply line 317, port 316 and a port 318 to which is connected air line 319. The air is allowed to pass through a flow control valve 320 similar in operation to the flow control valves 307 and 312 described with reference to Figure 16, to that end of the air motor 82 opposite to the piston rod connection 84. A port 321 is open to the atmosphere and in this position permits the air to leave the piston rod end of air motor 82 through line 322 whereby piston rod and connection 84 are moved outwardly and push plate 85 contacts and thereby pushes off the coiled article 15 from the unloading mechanism 30.

When it is desired to retract the push plate 85 the solenoid of valve 315 is deenergized and a direct connection between port 316, air line 317 and air line 322 is effected. Air line 319 and port 318 are then directly connected to the atmosphere through port 321. Thus, air is forced through sequence valve 323 and a flow control valve 324 similar in action to valves 307, 312 and 320 previously described, into the end of the air motor 82 having the piston rod and connection 84. The air on the end of air motor 82 opposite to the piston rod is in turn permitted to flow out of the air motor 82 thereby moving the piston rod and journal 84 as well as push plate 85 to the retracted position.

Thus, it may be seen that a suitable hydraulic system and a suitable pneumatic system have been provided whereby the unloading mechanism 30 may be actuated to cause rocking thereof as has been described and in addition, whereby the air motor 82 for push-off mechanism 40 may be effective to transfer a coiled article 15 from the unloading mechanism 30 when the same has reached the discharge position as indicated in Figure 10. While it is to be appreciated that the operation of the above-described systems may be operator controlled from a suitable remote control station, it is preferable that automatic operation be effected insofar as possible.

In view of this preference, a suitable electric circuit will be described whereby the operation of the unloading mechanism 30 as well as the coiled article push-off mechanism 40 will be semi-automatically effected. Briefly, it is believed worthy of note that the use of such control means contributes materially to the efficiency and safety of the system of conveying and handling a coiled article described herein.

Considering now in conjunction with the above described hydraulic and pneumatic systems, the schematic electrical diagram as shown in Figure 19, the operation of the unloading mechanism 30 in conjunction with push-off mechanism 40 will be described and it may be seen that only one operator responsive control need be provided in the entire system.

With the unloading mechanism 30 in the position shown in Figure 8 prior to reception of a coiled article 15 thereon, limit switches 408 and 434 are open while a limit switch 410 is closed. With push-off mechanism 40 retracted, a limit switch 412 is closed while a limit switch 411 is open. By this relationship a relay 413 is not energized and a normally closed contact 413a in line 421 is closed while the normally open contact 413b in line 417 is open. The relay 415 is energized when switch 412 is closed, thereby normally open contact 415a in line 421 is closed. Since there is no coiled article 15 on the roll trough assembly 20 contacting a load sensitive switch, the load sensitive electronic relay switch 420 is open and relay 426 is not energized and a normally closed contact 426a in line 422 is closed. A normally closed contact 409a in line 423 is open while the normally closed contact 432b in line 424 is maintained closed since coil 432 is not energized due to switch 413b in line 417 being open. In view of the fact that neither relay 432 nor 433 are energized, both solenoids A and B on the valve 300 are not energized and the centering springs of the valve will maintain said valve in the centered position.

When a cooperating pair of conveyor carts 1 carrying a coiled article 15 approach within 5 feet of the unloading mechanism 30, a switch 408 suitably placed on conveyor mechanism 10 is closed, thus energizing relay 413 to close normally open contacts 413b in line 417. Since limit switch 434 is open, relay 435 is not energized and normally closed contact 435a in line 418 is closed. A contact 436 is closed during normal conveyor operation. Thus, when contact 413b in line 417 is closed, relay 432' is energized to effect energization of solenoid A of the solenoid valve 300. This is effective to open a direct passage from the source of hydraulic pressure to conduit 309 and to the hydraulic cylinder 68 as has been described above and thus to effect the hundred pounds differential force essential for the operation of the unloading mechanism 30. Energization of relay 413 also opens normally closed contacts 413a in line 421 thereby maintaining coil 433 deenergized. When the conveyor carts 1 strike the abutment assembly 71 on unloading mechanism 30 and movement of the unloading mechanism 30 is initiated, limit switch 410 is opened whereby to deenergize a relay 409. The effect of this is to close normally open contacts 409a in line 423. In this respect it should be noted, however, that coil 433 remains deenergized since the contacts 413a in line 421 will be open. As the coiled article 15 contacts the unloading mechanism 30 having any type of load sensitive switch, electronic relay 400 is energized closing contacts 420 contained therein. Again, any suitable contact or load responsive means on, for example, one of the roller elements 52 or 52' may be utilized to establish the effect on relay 400 as desired. Thus, the relay 426 becomes energized since normally closed contact 441a is closed due to the fact that limit switch 411 is open while the coil push-off mechanism 40 is in the retracted position and by reason of this, a normally closed contact 426a, line 422 is open.

When the unloading mechanism 30 reaches a discharge position, as shown in dotted lines in Figure 8, limit switch 434 is closed to energize relay 435. This opens a normally closed contact 435a in line 418, thereby deenergizing coil 432. The deenergization of coil 432 opens the circuit to solenoid A of the valve 300 whereby the centering springs move the valve to the center position, thus closing all ports. In this position, hydraulic fluid can neither enter nor leave the unloader cylinder 68 and the unloading mechanism 30 is maintained in the unloading position, as shown in Figure 10. In addition, deenergizing relay 432 closes a normally closed contact 432b in line 424. As the unloaded carts 1 move around the sprocket 9 on the conveyor assembly 20, a suitably located contact is effective to open limit switch 408 deenergizing coil 413 to open normally open contact 413b in line 417 deenergizing coil 432 and to close normally closed contacts 413a in line 421. Although contacts 415a in line 421 and 409a in line 423 are closed, contact 426a in line 422 is open and thus the relay 433 remains deenergized.

When an operator presses the foot switch 440 in line 428, relay 438 is energized since a contact 442 affected by the downending mechanism 50 is closed when the downending mechanism is in a horizontal or load receiving position. The energization of the coil 438 closes a normally open contact 438a in line 431 maintaining the coil 438 in energized condition as long as the normally closed contact 441b in line 431 is closed. The energization of coil 438 closes the normally open contacts to solenoid air valve 315 previously described thereby causing the air motor 82 to expand causing push plate 85 to contact the coiled article 15 to move the same laterally off the unloading mechanism 30. The action of the push-off mechanism 40 is effective to open limit switch 412 which deenergizes a relay 415 and this in turn opens the normally open contacts 415a in line 421. When the coil push-off mechanism 40 has completed the action of pushing the coiled article 15 off of the unloading mechanism 30, contact 420 in the load controlled electronic relay 400 is opened. However, coil 426 remains energized by reason of the fact that a normally open holding contact 426a is closed. When the push-off device 40 is completely extended, the limit switch 411 is closed to energize a coil 441, thus opening normally closed contact 441a in line 412a, deenergizing relay 426 and allowing closure of normally closed contacts 426a in line 422.

In addition, normally closed contact 441b in line 431 is open whereby relay 438 is deenergized. This latter deenergization opens the energizing circuit to the solenoid operated air valve 315, thereby allowing retraction of the push-off mechanism 40. When the push-off mechanism is completely retracted, switch 412 is again closed to energize coil 415, thereby closing a normally open contact 415a in line 421. Since all contacts to coil 433 are now closed, coil 433 is energized, thereby closing the circuit to solenoid B of solenoid operated fluid valve 300 in the hydraulic unloader system shown in Figure 16. This actuates the solenoid B to shift the valve to a position toward B whereby a passage is provided from port 302 to the reservoir R and the pressure connection is closed off to permit fluid to flow into unloader cylinder 68 on the piston rod side only such that, accompanied by the out-flow of displaced fluid on the opposite side of the piston, the unloading mechanism 30 will be moved back to its article receiving position as clearly shown in Figure 8. As the unloading mechanism 30 leaves its discharging position, limit switch 434 is opened, deenergizing coil 435 closing contact 435a in line 418. Since switch 413b in line 417 is open, coil 432 remains deenergized. Upon the return of unloading mechanism 30 to its load receiving position, contact 410 is closed to energize coil 409 and thus open normally closed contact 409a in line 423 to deenergize coil 433 whereby the springs return valve 300 to its center position wherein all ports are closed. In this position, both coils 432 and 443 are deenergized until a pair of cooperating conveyor carts approach within 5 feet of the unloading mechanism 30 at which point coil 413 is again energized by the actuation of limit switch 408.

Thus, in brief, it may be seen that the operation of the unloading mechanism 30 with respect to the conveyor mechanism 10 is completely automatic and may be effective by suitable contact responsive switches arranged on the framework 60 of conveyor mechanism 10 as well as on the unloading and push-off mechanisms 30 and 40 in such a manner as to be contacted by the conveyor carts 1, respectively, and also by contact of coiled article 15 on the trough-shaped roll surfaces formed by roller elements 52, 52' on the unloader 30. From this point until the push-off operation by push-off mechanism 40 is completed, it may be seen that only one operator station is required and that the particular station can be so located by reason of the flexibility of the control system at such a place or such a location as to be substantially removed from the direction of movement of the coiled article 15 or any of the unloading machinery which might endanger a person manning such a station. In this respect it will be appreciated that the one operator actuated switch 440 which serves to initiate the action push-off mechanism 40 may be controlled by conventional push button controls from a remotely located operator station.

Thus, the apparatus and conveying system disclosed are effective to perform the objects set forth in the specification and as it may be seen, produce a highly efficient rapid removal of the coiled sheet material from the belt wrappers or like coiling machinery to a position of relative safety wherein such manual operations as are necessary to prevent spring-back thereof may be performed.

It is to be understood that various changes and modifications may be made in the foregoing apparatus and system and construction of the parts thereof, and substitution of equivalent mechanism effected without departing from the spirit of the invention and the scope of the appended claims.

What is claimed is:

1. A conveying system for a coiled article comprising endless conveyor means including an article loading station and an article unloading station, means positioned at said loading station for receiving and centering a coiled article with respect to the longitudinal center line of said endless conveyor means and including means for lowering said coiled article to be conveyed onto said endless conveyor means for movement thereby, unloader means positioned at said discharge station of said endless conveyor means to receive said conveyed coiled article without interrupting and interfering with the normal forward movement of said endless conveyor means, said unloading station being also provided with article push-off means and common control means for actuating all of said means in a predetermined timed sequence of operation so as to effect automatic centering and loading as well as unloading of said coiled article with respect to said endless conveyor means, all of said above-mentioned means acting to maintain said coiled article in a position whereby its axis of winding is parallel to any given horizontal plane to prevent accidental unwinding of said coil article from the time said article is received at said loading station until said article is discharged at said unloading station.

2. A conveying system for a coiled sheet article comprising conveying means, a loading station and an unloading station; centering and lowering means at said loading station for positioning a coiled sheet article to be conveyed on said conveying means; unloading means including a push-off means at said unloading station acting to unload a conveyed coiled sheet article from said conveyor means without interrupting and without interfering with the normal forward movement of said latter means; all of said means acting to maintain said coiled article in a position with its axis disposed at all times in a horizontal plane such as to prevent spring-back and unwinding thereof, and common control means for actuating all of said means in a predetermined timed sequence of operation.

3. A conveying system for a series of successive coiled sheet articles comprising longitudinally moving endless conveying means having a loading zone and an unloading zone, fluid pressure actuated article centering and loading elements at said loading zone, article unloading means at said unloading zone for unloading successive coiled sheet articles from said longitudinally moving endless conveying means without interrupting the normal forward movement of said latter means, and article contacting push-off means at said unloading zone and cooperating with said unloading means to move successive coiled sheet articles laterally of the direction of movement of said longitudinally moving endless conveyor means, and control means responsive to the movements of successive coiled sheet articles and said longitudinally moving endless conveyor means for actuating said fluid pressure actuated centering, loading and unloading means, all of said means in turn cooperating to maintain successive coiled sheet articles in a position such that their axis of coiling will be parallel to any given horizontal plane from the time said coil articles are received at said loading zone until they are discharged at said unloading zone.

4. A conveying system for successive coiled sheet articles as defined in claim 3, wherein said fluid pressure actuated article centering means includes oppositely acting reciprocating hydraulic motors reciprocal in a direction transverse to the direction of movement of said longitudinally moving endless conveyor means.

5. A conveying system for a series of successive coiled sheet articles comprising longitudinally moving endless conveying means having a loading zone and an unloading zone, fluid pressure actuated article centering and loading elements at said loading zone, said article loading means including oppositely swinging hydraulically actuated arm members adapted to contact the lower peripheral surface of successive coiled sheet articles, the axis of swinging of said arms being transverse to the direction of movement of said longitudinally moving endless conveying means, article unloading means at said unloading zone for unloading successive coiled sheet articles from said longitudinally moving endless conveying means, and article contacting push-off means at said unloading zone and cooperating with said unloading means to move successive coiled sheet articles laterally of the direction of movement of said longitudinally moving endless conveyor means, and control means responsive to the movements of successive coiled sheet articles and said longitudinally moving endless conveyor means for actuating said fluid pressure actuated centering, loading and unloading means, all of said means in turn cooperating to maintain successive coiled sheet articles in a position such that their axis of coiling will be parallel to any given horizontal plane.

6. A conveying system for a series of successive coiled sheet articles comprising longitudinally moving endless conveying means having a loading zone and an unloading zone, fluid pressure actuated article centering and loading elements at said loading zone, article unloading means at said unloading zone for unloading successive coiled sheet articles from said longitudinally moving endless conveying means, said unloading means comprising a rockable, article receiving surface alternately movable toward and away from said longitudinally movable endless conveying means and in a direction parallel to the longitudinal direction of movement of said endless conveying means, and article contacting push-off means at said unloading zone and cooperating with said unloading means to move successive coiled sheet articles laterally of the direction of movement of said longitudinally moving endless conveyor means, and control means responsive to the movements of successive coiled sheet articles and said longitudinally moving endless conveyor means for actuating said fluid pressure actuated centering, loading and unloading means, all of said means in turn cooperating to maintain successive coiled sheet articles in a position such that their axis of coiling will be parallel to any given horizontal plane.

7. A conveying system for coiled sheet articles as defined in claim 6, wherein said unloading means further includes a pneumatically operated push-off means, said push-off means moving successive coiled articles across and from said rockable article receiving surface laterally of the longitudinal direction of movement of said endless conveying means and said rockable, article receiving surface.

8. In a conveying system for successive coiled sheet articles, the combination of a plurality of horizontally disposed, successive article receiving supports movable in the direction of their normal longitudinal axis, a loading mechanism comprising a pair of oppositely swingable interconnected load supporting arm members swingable about parallel axes disposed transverse to the direction of movement of said movable article receiving supports, said oppositely swingable interconnected arms including anti-friction surfaces disposed above the top surface of said longitudinally movable article receiving supports in one position and below the surface of said movable article receiving supports in a second position, certain portions of said anti-friction surfaces also being inter-digitated between and to either side of the horizontally disposed longitudinally movable article receiving supports, said oppositely swingable interconnected load supporting arms also being disposed in a position with the anti-friction surfaces above said longitudinally movable article receiving supports upon receipt of successive coiled sheet articles and swingable to a position with the anti-friction surfaces disposed below said longitudinally movable article receiving supports during transfer of each of said series of coiled sheet articles, and hydraulic means for swinging said interconnected load supporting arms from load receiving to load transferring position and back to load receiving position.

9. A conveying system for coiled sheet articles comprising endless conveying means having a loading end and an unloading end, hydraulic article centering and lowering means at said loading end, said centering means including oppositely disposed pusher members and a contact plate disposed adjacent one of said oppositely disposed pusher members adapted to contact successive coiled sheet articles, reciprocal hydraulic motors for moving said oppositely disposed pusher members toward and away from each other, said centering means further including hydraulic flow control means actuating said hydraulic motors toward and away from a coiled sheet article in equal and opposite increments, said hydraulic means being actuated in response to contact of a coiled article with said contact plate.

10. A centering device for an endless conveyor comprising a pair of horizontally disposed reciprocating hydraulic motors disposed to either side of said endless conveyor and including article contacting surfaces movable toward and away from each other, one of said reciprocating hydraulic motors being swingably movable with respect to the other of said motors from a position in axial alignment therewith to a position out of axial alignment therewith, hydraulic means acting to swing said swingably movable reciprocating hydraulic motor to either of said two positions and including control means responsive to movement of an article to be conveyed and centered for moving said swingable reciprocating hydraulic motor into its axially aligned position with respect to the other of said reciprocal hydraulic motors and for instigating reciprocal movement of said article contacting elements toward each other and said article.

11. A conveying system for a coiled article comprising a longitudinally extending endless conveyor means including a loading station and an unloading station, separate article centering and lowering means positioned at said loading station, said article lowering means including oppositely movable swinging arm members having the top portions thereof provided with load receiving roller means, the axis of swinging of the respective arms being in parallel relation and disposed transversely to the direction of movement of said endless conveying means, means interconnecting said arms and including a source of power actuation such that when swung in a position approaching a vertical plane the arms and the anti-friction roller surfaces are the sole support for a coiled article and when swingable in the opposite direction, a coiled article is lowered onto the conveyor means; said centering means comprising a pair of reciprocal hydraulic motors including article contacting plates movable toward and away from each other and the longitudinal center line of said longitudinally extending conveyor means so as to effectively center an article with respect to said longitudinally extending conveying means, one of said oppositely reciprocal hydraulic motors being mounted on a fixed support and the other of said reciprocal hydraulic motors being mounted on a swingable support such that said latter mentioned reciprocal hydraulic motor may be alternately swung from a position in axial alignment with said first mentioned hydraulic reciprocal motor means and then to a position out of axial alignment with said first mentioned reciprocal hydraulic motor means to permit movement of the coiled article in a direction laterally of the longitudinal center line of the conveying means; said oppositely swingable interconnected arms being in such a position as to support and withhold a coiled article from the conveying means until such time as the elements of said centering means have been moved into contact with the coiled article to center said article with respect to said longitudinal center line of said conveying means and said lowering means, and control means interconnecting said lowering means and said centering means in such a manner that said lowering means will be actuated upon completion of the action of said centering means to deposit a coiled article on said conveying means for movement along a path paralleling the longitudinal center line of said endless conveying means, said unloading station including means to unload a conveyed coiled article from said conveyor means without interrupting the normal forward movement of the latter means and push-off means, all of said means acting to maintain said coiled article whereby the axis of coiling will be horizontal.

12. A conveying system for transporting a coiled article comprising an endless conveyor having a plurality of spaced, longitudinally movable, article supporting elements, a hydraulically actuated centering means for centering a coiled article on any given one of the load supporting elements, vertically movable load transfer means receiving a laterally moving coiled article and supporting said coiled article above a load supporting element during operation of said centering means, control means for said vertically movable load transfer means acting to lower said coiled article onto a load supporting element of said endless conveyor subsequent to action of said centering means in properly positioning the coiled article with respect thereto.

13. A conveying system for transporting a coiled article as defined in claim 12, wherein said vertically movable transfer means is hydraulically actuated.

14. In a conveying system for coiled articles including an endless conveyor having a frame and a longitudinally movable article conveying surface, a loading station and an unloading station, the improvement comprising parallel shafts journaled on said conveyor frame transversely of the direction of movement of said article conveying surface, load carrying arms fixed to said shafts, said arms including meshed segmental gear means cooperating to cause equal and opposite movement of each of said arms with respect to the other, the upper ends of said load carrying arms being provided with a series of anti-friction rollers comprising a load bearing surface adapted to receive an article moving in a direction transverse to the direction of said longitudinally movable article conveying surface, reciprocal hydraulic motor means connected to one of said load bearing arms, said load bearing surface formed by said anti-friction rollers being movable vertically by swinging of said load carrying arms such that in one position said last mentioned surface comprises the sole support for a coiled article and in a second position said last mentioned load bearing surface is disposed beneath the longitudinally movable article conveying surface and free of a coiled article.

15. In a conveying system for coiled articles including a frame and longitudinally movable load transporting means, a loading station and an unloading station, the improvement comprising a pair of reciprocal hydraulic motor means disposed to either side of and supported on said conveyor frame adjacent said loading station, one of said reciprocal hydraulic motor means including means journaled on said frame for movement of said one of said reciprocal hydraulic motor means from a position out of axial alignment with respect to the other of said reciprocal hydraulic motor means to a position axially aligned with the other of said reciprocal hydraulic motor means, article contacting means carried by said reciprocal hydraulic motor means and movable toward and away from each other and said longitudinally movable load transporting means of said conveying system when said one reciprocal hydraulic motor means is positioned in axial alignment with the other of said reciprocal hydraulic motor means, and hydraulic control means including a pair of constant volume rotary motors interconnected together for causing equal and opposite movement of said reciprocal hydraulic motor means and said article contacting means simultaneously, said reciprocal hydraulic motor means and said article contacting means acting to center a coiled article to be conveyed relative to the direction of movement of said longitudinally movable load transporting surface upon movement toward each other.

16. A conveying system for coiled sheet articles comprising a series of longitudinally movable, laterally spaced load transporting carts movable on parallel symmetrically arranged rail means, support means for said rail means, an article receiving and lowering means interdigitated with said laterally spaced, longitudinally movable load transporting carts, means for receiving a coiled article and lowering the same to a given one of said series of laterally spaced longitudinally movable load transporting cart means, a centering means including equal and oppositely reciprocal hydraulic motor means for centering a given article relative to one of said series of longitudinally movable load supporting carts, said centering means including a hydraulic flow control means for actuating said equal and oppositely movable reciprocal hydraulic motor means, said hydraulic flow control means including an electrical circuit responsive to the action of said article receiving and lowering means whereby said article receiving and lowering means acts to lower an article onto one of said series of longitudinally movable cart means after said centering means acts to center a coiled article with respect to a given one of said laterally spaced longitudinally movable load supporting carts.

17. A conveying system for a coiled article comprising endless conveyor means including a loading station and an unloading station, means positioned at said loading station for receiving and centering a coiled article with respect to the longitudinal center line of said endless conveyor means, and including means for lowering said coiled article to be conveyed onto said endless conveyor means for movement thereby, unloader means positioned at said discharge station of said endless conveyor means to receive said conveyed coiled article without interrupting and interfering with the normal forward movement of said endless conveyor means, said unloading station being also provided with article push off means, all of said above mentioned means acting to maintain said coiled article in a position whereby its axis of winding is parallel to any given reference plane.

18. In a conveying system for a coiled article, the combination of a longitudinally extending endless conveyor means and a loading station, separate article centering and lowering means positioned at said loading station, said article lowering means including oppositely movable swinging arm members having the top portions thereof provided with load receiving roller means, the axis of swinging of the respective arms being in parallel relation and disposed transversely to the direction of movement of said endless conveying means, means interconnecting said arms and including a source of power actuation such that when swung in a position approaching a vertical plane the arms and the anti-friction roller surfaces are the sole support for a coiled article and when swingable in the opposite direction a coiled article is lowered onto the conveying means, said centering means comprising a pair of reciprocal hydraulic motors including article contacting plates movable toward and away from each other and the longitudinal center line of said longitudinally extending conveyor means so as to effectively center an article with respect to said longitudinally extending conveying means, one of said oppositely reciprocal hydraulic motors being mounted on a fixed support and the other of said reciprocal hydraulic motors being mounted on a swingable support such that said latter-mentioned reciprocal hydraulic motor may be alternately swung from a position in axial alignment with said first-mentioned hydraulic reciprocal motor means and then to a position out of axial alignment with said first-mentioned reciprocal hydraulic motor means to permit movement of the coiled article in a direction laterally of the longitudinal center line of the conveying means, said oppositely swingable interconnected arms being in such a position as to support and withhold a coiled article from the conveying means until such time as the elements of said centering means have been moved into contact with the coiled article to center said article with respect to said longitudinal center line of said conveying means and said lowering means, and control means interconnecting said lowering means and said centering means in such a manner that said lowering means will be actuated upon completion of the action of said centering means to deposit a coiled article on said conveying means for movement along a path paralleling the longitudinal center line of said endless conveying means.

19. A conveying system for coiled articles comprising endless conveying means having a loading end and an unloading end, article lowering means including oppositely movable swinging arm members having the top portions thereof provided with load receiving roller means, the axis of swinging of the respective arms being in parallel relation and disposed transversely to the direction of movement of said endless conveying means, means interconnecting said arms and including a source of power actuation such that when swung in a position approaching a vertical plane the arms and the anti-friction roller surfaces are the sole support for a coiled article and when swingable in the opposite direction, a coiled article is lowered onto the conveying means.

20. A conveyor system for coiled articles comprising endless conveying means having a loading end and an unloading end, article centering means positioned at said loading end, said centering means comprising a pair of reciprocal hydraulic motors including article contacting plates movable toward and away from each other and the longitudinal center line of said longitudinally extending conveyor means so as to effectively center an article with respect to said longitudinally extending conveying means, one of said oppositely reciprocal hydraulic motors being mounted on a fixed support and the other of said reciprocal hydraulic motors being mounted on a swingable support such that said latter-mentioned reciprocal hydraulic motor may be alternately swung from a position in axial alignment with said first-mentioned hydraulic reciprocal motor means and then to a position out of axial alignment with said first-mentioned reciprocal hydraulic motor means to permit movement of the coiled article in a direction laterally of the longitudinal center line of the conveying means.

21. A conveying system for coiled sheet articles comprising conveyor means, a loading station and an unloading station, a centering and lowering means at said loading station for positioning a coiled sheet article to be conveyed on said conveying means, said lowering means comprising a pair of oppositely swingable interconnected, load supporting arm members swingable about parallel axes disposed transverse to the direction of movement of said conveying means, said oppositely swingable interconnected arms including antifriction surfaces disposed above the top surface of said conveyor means in loading position and below the surface of said conveyor means in unloading position, hydraulically actuated means for moving said arms in equal and opposite directions from the loading position to the unloading position with respect to said conveying means, unloading means at said unloading station acting to unload a conveyed coiled article from said conveyor means, push-off means disposed adjacent said unloading means and adapted to remove a coiled sheet article from said unloading means, said unloading means and said push-off means acting to unload a conveyed coiled sheet article from said conveyor means without interrupting or interfering with the normal forward movement of said latter means, all of said means acting to maintain said coiled article in a position such that its axis of coiling is disposed parallel to a given horizontal plane, and common control means for actuating all of said means in a predetermined timed sequence of operation.

22. A conveying system as defined in claim 21 wherein said unloading means comprises a trough-shaped load receiving surface and an abutment element, a plurality of pairs of swingable arms rockably supporting said load receiving surface and said abutment element, said arms being swingable about parallel horizontal axes disposed transversely to the direction of movement of said article carrying and conveying elements, said trough-shaped load receiving surface when disposed in load receiving position, lying slightly below the article receiving surface of an individual article carrying and conveying element, said abutment being positioned in the path of movement of said load carrying and conveying elements, one of the pairs of said plurality of pairs of swingable arms being connected to a reciprocal preloading hydraulic motor means, said trough-shaped load receiving surface being adapted to move in an elliptical path instantaneously and in synchronism with the movements of the load bearing surface of any one of said individual article carrying and conveying elements upon contact of said last mentioned elements with said abutment element whereby an article supported on any one given article carrying and conveying element will be removed therefrom without interruption of the normal forward movement of the article carrying and conveying element.

23. A conveying system as defined in claim 21 wherein said push-off means comprises a support means, an upwardly facing channel-like structure carried by said support means and disposed in a horizontal position, a series of rollers carried by said channel means and disposed in a common horizontal plane, an inverted channel means including spaced guide means engaging said roller means fixed in telescopically movable relation with respect to said upwardly facing channel means, pneumatic motor means connected to each of said channel means and located within the space defined by said oppositely facing channel means, and an article contacting element carried by said inverted channel means, said inverted channel means and said article contacting means adapted to move toward and away from an article to be contacted by said contacting means in response to movement of said pneumatic motors means.

References Cited in the file of this patent

UNITED STATES PATENTS

| | | |
|---|---|---|
| 1,641,998 | Von der Horst | Sept. 13, 1927 |
| 1,911,912 | Mathieson | May 30, 1933 |
| 2,059,703 | McBane | Nov. 3, 1936 |
| 2,262,118 | Sieger | Nov. 11, 1941 |
| 2,361,222 | McBride | Oct. 24, 1944 |
| 2,571,947 | Russell | Oct. 16, 1951 |
| 2,612,275 | Chapman | Sept. 30, 1952 |
| 2,640,580 | De Burgh | June 2, 1953 |
| 2,641,371 | Webster | June 9, 1953 |
| 2,651,087 | Fellows | Sept. 8, 1953 |
| 2,682,330 | Thomas | June 29, 1954 |
| 2,723,393 | Verrinder et al. | Nov. 15, 1955 |
| 2,725,137 | Muddiman | Nov. 29, 1955 |